(12) United States Patent
Chapman et al.

(10) Patent No.: US 8,009,209 B2
(45) Date of Patent: Aug. 30, 2011

(54) METHODS AND APPARATUS FOR DETECTING DEFECTS IN IMAGING ARRAYS BY IMAGE ANALYSIS

(75) Inventors: Glenn Harrison Chapman, Coquitlam (CA); Israel Koren, Amherst, MA (US); Zahava Koren, Amherst, MA (US); Jozsef Dudas, Vancouver (CA); Cory Jung, Vancouver (CA)

(73) Assignee: Simon Fraser University, Burnaby, British Columbia (CA)

( * ) Notice: Subject to any disclaimer, the term of this patent is extended or adjusted under 35 U.S.C. 154(b) by 514 days.

(21) Appl. No.: 12/088,674

(22) PCT Filed: Oct. 2, 2006

(86) PCT No.: PCT/CA2006/001619
§ 371 (c)(1),
(2), (4) Date: Mar. 28, 2008

(87) PCT Pub. No.: WO2007/036055
PCT Pub. Date: Apr. 5, 2007

(65) Prior Publication Data
US 2008/0218610 A1 Sep. 11, 2008

Related U.S. Application Data

(60) Provisional application No. 60/722,657, filed on Sep. 30, 2005.

(51) Int. Cl.
*H04N 9/64* (2006.01)
(52) U.S. Cl. ........................ 348/246; 348/247
(58) Field of Classification Search .............. 348/246, 348/247
See application file for complete search history.

(56) References Cited

U.S. PATENT DOCUMENTS

| 3,971,065 | A  | 7/1976  | Bayer          |
|-----------|----|---------|----------------|
| 4,193,093 | A  | 3/1980  | St. Clair      |
| 4,590,520 | A  | 5/1986  | Frame et al.   |
| 5,680,476 | A  | 10/1997 | Schmidt et al. |
| 5,694,228 | A  | 12/1997 | Peairs et al.  |
| 6,381,357 | B1 | 4/2002  | Tan et al.     |
| 6,498,831 | B2 | 12/2002 | Granfors et al.|
| 6,625,318 | B1 | 9/2003  | Tan et al.     |
| 6,724,945 | B1 | 4/2004  | Yen et al.     |
| 6,819,358 | B1 | 11/2004 | Kagle et al.   |
| 7,009,644 | B1 | 3/2006  | Sanchez et al. |
| 7,034,874 | B1 | 4/2006  | Reinhart et al.|

(Continued)

OTHER PUBLICATIONS

Jin et al., "Modeling and Analysis of Soft-Test/Repair for CCD-Based Digital X-ray Systems", *IEEE Trans. Instrumentation and Measurement*, vol. 52, pp. 1712-1721, Dec. 6, 2003.

*Primary Examiner* — James M Hannett
(74) *Attorney, Agent, or Firm* — Oyen Wiggs Green & Mutala

(57) ABSTRACT

Methods for detecting defective pixels in imaging arrays involve establishing probabilities that individual pixels are defective and updating those probabilities by analysing images acquired by the imaging arrays. Probabilities may be evaluated for each of two or more defect conditions. The methods may be used to detect defects such as stuck-low, stuck-high, high-sensitivity, low sensitivity, hot, and defect-free conditions. Other more complicated defect conditions can also be detected. Apparatus for detecting defective pixels may be integrated with a camera or other imaging device or provided separately.

60 Claims, 12 Drawing Sheets

U.S. PATENT DOCUMENTS

| | | |
|---|---|---|
| 7,202,894 B2 | 4/2007 | Kaplinsky et al. |
| 7,286,179 B2 | 10/2007 | Chen et al. |
| 7,356,167 B2 | 4/2008 | Kita |
| 7,362,897 B2 | 4/2008 | Ishiga |
| 7,372,484 B2 | 5/2008 | Mouli |
| 7,375,749 B2 | 5/2008 | Hattori |
| 7,388,609 B2 | 6/2008 | Pinto et al. |
| 2003/0076989 A1 | 4/2003 | Maayah et al. |
| 2006/0012695 A1* | 1/2006 | Chang et al. ......... 348/246 |
| 2009/0303357 A1* | 12/2009 | Tajima et al. ......... 348/246 |

* cited by examiner

METHODS AND APPARATUS FOR DETECTING DEFECTS IN IMAGING ARRAYS BY IMAGE ANALYSIS

CROSS-REFERENCE TO RELATED APPLICATION

This application is a 371 of PCT/CA2006/001619 filed Oct. 2, 2006 which claims the benefit of U.S. Provisional Application No. 60/722,657 filed Sep. 30, 2005, which is hereby incorporated herein by reference.

TECHNICAL FIELD

This invention pertains to detecting defects in imaging arrays. The invention may be applied, for example, to detecting defects in imaging arrays in digital cameras, infrared sensors, X-ray imaging equipment, images produced by arrays of acoustic, electrical, and/or chemical sensors and the like.

BACKGROUND

Digital cameras and other imaging devices are becoming widely used in both consumer and industrial applications. Such devices acquire images by way of an imaging array. An imaging array typically comprises an array of radiation-sensing elements or "pixels". The pixels are typically arranged in rows and columns. Arrays of Charge-Coupled Devices (CCDs) and Active Pixel Sensor ("APS") arrays are two examples of imaging arrays.

The resolution of images acquired by an imaging array depends upon the density of pixels in a sensing area of the imaging array. Providing more pixels within the same sensing area provides higher-resolution images. An imaging array in a digital camera may have several million pixels, for example.

The probable number of defective pixels in an imaging array tends to increase with the number of pixels in the imaging array. Pixel failure may occur when the imaging array is fabricated, later when the imaging array is exposed to a stressful environment or as a result of components degrading over time. Like all microelectronics, as imaging arrays age their components can start to fail. General electronic devices tend to produce failures either during their first six months (called infant mortality) or after a few years (typically three years or more). In many devices (computers, cell phones) these failures render the device unusable. However, in camera systems, failures of some pixels are not necessarily catastrophic because such failures can often be corrected for.

In an imaging array having a large number of pixels, it is likely that at least a few of the pixels will be defective. For this reason, many digital cameras employ software correction. The software correction may replace the outputs from pixels determined at fabrication time to be defective with corrected outputs. The corrected outputs are often weighted averages of outputs from adjacent non-defective pixels.

In the fields of amateur and professional photography, pixel failures have become more noticeable as digital camera use has become more widespread. Such failures tend to appear as defective pixels or areas of the picture which are not correct. These can be quite noticeable and will tend to accumulate over time. Higher-end cameras, such as digital single lens reflex ("SLR") cameras, are quite expensive. It is undesirable to have to replace such equipment because a few pixels have become defective. However, unless the defective pixels are identified and corrected for the presence of the defective pixels degrades images obtained with the camera.

Defective pixels in imaging arrays can cause particularly acute problems in imagers operating at wavelengths outside of the visible spectrum. For example, fabrication processes for infrared imagers are often more complex than those for visible light imagers. Thus infrared imagers often have defect rates significantly higher than visible imagers. Similarly, digital medical X-ray imagers require large areas and are fabricated using processes that can make them more prone to faults. Further, obtaining accurate images can be important in the medical and scientific areas in which such imagers are applied.

Faults in imaging systems are becoming more prevalent as the areas and pixel counts of imaging arrays increase while pixel size shrinks. Consequently, identifying and correcting for pixel faults is crucial to improve the yield (during fabrication) and reliability (during operation) of imaging arrays.

To correct defective pixels with either software or hardware techniques, the location of defective pixels must be determined. The simplest defect models assume a pixel can be "good" (non-defective), "stuck high" (always bright or white), or "stuck low" (always dark). More advanced fault models include low- and high-sensitivity pixels and hot pixels.

It is known to detect defective pixels in an imaging array at fabrication time by taking two exposures with the array. A dark-field (no illumination) exposure detects pixels that are stuck high. A light-field (illumination level near saturation) exposure detects pixels that are stuck low or have low sensitivity. Dark-frame exposures can typically be obtained in the field. Uniform light-field illumination (or any uniform illumination) is difficult to obtain without additional hardware.

It is more difficult to detect pixels which respond to exposure but have defects which cause the pixels to have sensitivities that are significantly different from the nominal pixel sensitivity. More advanced techniques can detect faults such as high-sensitivity pixels. A high-sensitivity pixel provides a low output value when it is not illuminated but rapidly saturates at modest illumination levels. High-sensitivity pixels are thus not detectable with two simple illumination fields.

Most cameras employ colour imaging arrays. Colour imaging arrays present further complications. A colour imaging array typically comprises red-, green- and blue-filtered pixels. The pixels may be arranged in a pattern called the "Bayer Matrix pattern" as disclosed in Bayer, U.S. Pat. No. 3,971,065. Defects will typically be distributed among pixels at each colour site on the matrix, and hence defect detection must take into account the colour filter pattern of the imaging array.

Frame et al., U.S. Pat. No. 4,590,520 discloses detecting pixel faults by performing a post-production calibration to obtain "correction coefficients" for each pixel. A pixel is identified as being bad if its correction coefficient is not close to the values of the correction coefficients of neighbouring pixels.

Kagle et al., U.S. Pat. No. 6,819,358 discloses identifying defective pixels by means of light-, dark- and intermediate-range exposures. This technique can identify some pixels that have abnormal sensitivities (high or low).

St. Clair, U.S. Pat. No. 4,193,093 discloses that stuck-high pixels can be identified in a video imager by comparing the pixel values to the saturated video signal. However, in any complex image, this would falsely detect as being stuck-high many pixels that are in saturation due to the exposure of the image.

Peairs et al., U.S. Pat. No. 5,694,228 discloses methods for identifying defects in an imager based upon digital images of scanned documents. The methods involve incrementing a counter for potential defects when a pixel location has the same colour in more than a threshold number of the digital images. Otherwise the counter is reset or decremented.

Jin et al. *Modeling and Analysis of Soft-Test/Repair for CCD-Based Digital X-ray Systems* IEEE Trans. Instrumentation and Measurement vol. 52, pp. 1712-1721, December 2003 compare the difference between a pixel value and the average of pixel values for eight nearest-neighbour pixels to high or low threshold values to identify faulty pixels.

Tan et al., U.S. Pat. No. 6,381,357 discloses identifying pixel faults using the difference between a pixel value and the average of pixel values for the four or eight nearest-neighbour pixels combined with sequential probability ratio testing on multiple images to identify defects.

These methods can be susceptible to incorrectly identifying good pixels as being defective (i.e. creating significant numbers of false positives). In some reported cases these methods can give as many, or more, false positives as correctly-identified faults. In some cases these methods have been found to yield two or more times as many false positives as the actual number of defective pixels.

False positives can be as detrimental to image quality as defective pixels. If the outputs of pixels falsely identified as faulty are replaced by interpolating the output from neighbouring pixels, as understood by practitioners of the art, the image quality can be reduced. This is particularly true if the pixel lies in an area where the image changes rapidly, such as at the edge of an object.

There remains a need for robust methods and apparatus for detecting defective pixels in imaging arrays. There is a particular need for such methods and apparatus that can be performed on-line (i.e. while a device is operating) to detect faults that occur after fabrication.

SUMMARY

This invention provides methods and associated apparatus for identifying and classifying pixels in imaging arrays. The methods apply statistical tests to pixel values in regularly-captured images to identify faulty pixels. Statistical information from a sequence of images collected in the course of normal operation of the imaging array can be used to determine if each pixel operates properly or, if not, to identify the type of defect affecting the pixel. A map indicating the locations of defective pixels may be generated and used for subsequent correction of images from that imaging array. The methods can be implemented in ways that have very low probability of obtaining false positive or missed defective pixels, and can identify a wide range of pixel defect types. The map may identify the type of defect affecting some or all of the defective pixels. Such defect type information may be used in obtaining corrected pixel values.

Apparatus according to the invention implements the methods to identify and/or classify defective pixels. The apparatus may be incorporated into an imaging device or may comprise a separate apparatus that receives and analyses images obtained by an imaging device. The apparatus may provide various outputs. For example, the apparatus may provide as outputs any or any combination of:
 a map identifying defective pixels in an imager;
 statistical information regarding defective pixels (e.g. how many defective pixels are there?, what different types of defective pixels are represented?, what is the relative frequency of different types of pixel defect?, or the like);
 software or data/instructions for software that cause the software to correct images taken with a particular imager; and,
 corrected images.

Further aspects of the invention and features of various example embodiments of the invention are described below.

BRIEF DESCRIPTION OF THE DRAWINGS

In the accompanying drawings, which illustrate non-limiting example embodiments of the invention.

DESCRIPTION

This invention can be used to locate defective pixels in imaging arrays. The imaging arrays may be two-dimensional arrays which have rows and columns of pixels. The pixels may comprise CCD or APS sensing elements, for example. The invention does not rely on any particular technology being used to implement the pixels or any particular arrangement of the pixels. In general, each pixel may comprise any device which generates an output signal which varies with the intensity of an incident signal of some kind. The incident signal may comprise, for example: illumination by visible or non-visible light, X-rays or other electromagnetic radiation, sound, vibration, temperature, electrical voltages or currents, pH, chemical compositions or the like.

Methods of the invention operate on a group of digital images obtained using the imaging array. The digital images may be acquired in the normal course of operating the imaging system of which the imaging array is a part. The digital images may be obtained from an imaging array in any suitable way. Those skilled in the art of designing imaging systems understand various such ways. Each digital image comprises values corresponding to elements of the imaging array.

For example, signals from pixels of the imaging array may be converted into digital intensities, often with the assistance of a digital processor that controls operation of the imaging array. For example, a suitable number such as 8, 12 or 16 bits of digital data may be obtained for each pixel (some examples below use 8 bits of digital data per pixel for purposes of illustration). The processor then creates a data file from which a value can be extracted for each pixel. The value for each properly-operating pixel is related in a desired way to the intensity of the incident signal. Such a data file may be stored within the imaging system, on a memory storage device connected to the imaging system, or the like. The data file may be exported to external computers or external data storage devices. The data file may be used to reproduce the image on a display, printer or the like and/or used to analyse the image.

Methods according to the invention may be performed by a data processor built into or associated with an imaging system or by a data processor in an external computer system which receives image data from an imaging array. The methods may be used to create a defect map, which may be stored as a defect image file. The defect map may be used to correct images already gathered, future images, or both. Many current digital cameras have provision for importing defect maps from an external-computer. Such defect maps may be used by a processor in the camera for internal correction of images acquired by the camera. Methods according to the invention may involve creating such defect maps and making the defect maps available to a camera or other imaging or image processing device.

Figure 1:
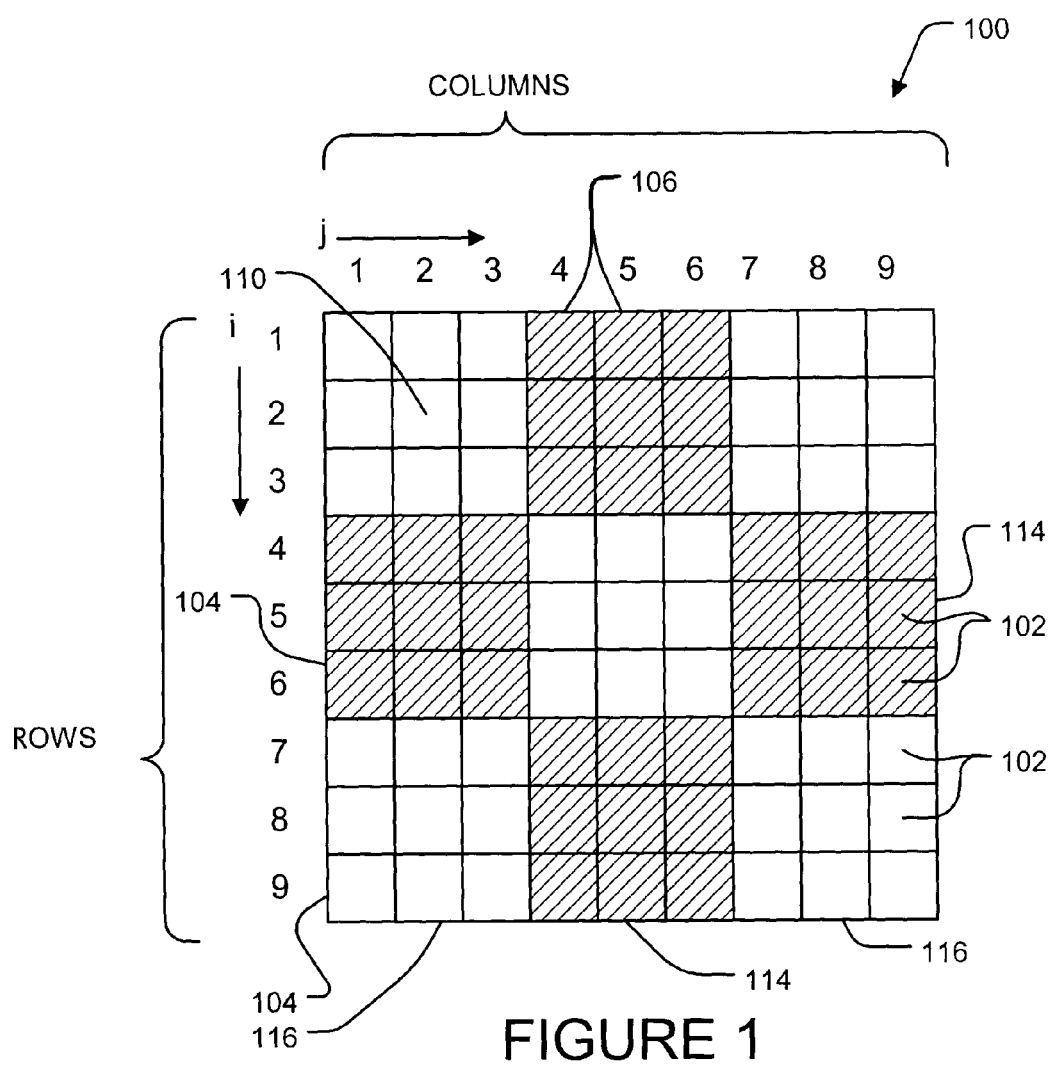
FIG. 1 shows schematically a part of a two-dimensional monochrome imaging array imaging a checkerboard pattern that is focused on and aligned with the array.

Example methods and apparatus according to various embodiments of the invention will now be described. FIG. 1 shows schematically a portion of a basic monochrome imaging array 100. Such imaging arrays are used in a wide range of cameras and other imaging systems. Imaging array 100 has pixels 102 arranged in rows 104 and columns 106. Each pixel 102 is sensitive to illumination in a wavelength range being detected. For convenient identification, rows 104 are numbered sequentially from the top with a coordinate i and columns 106 are numbered sequentially from the left with a coordinate j. For example, pixel 110 has the coordinates i=2 and j=2.

In normal operation, an image is projected onto imaging array 100. In this particular example, a checkerboard pattern made up of dark squares 114 having dimensions 3×3 pixels and light squares 116 also having dimensions of 3×3 pixels is projected onto imaging array 100. In dark squares 114 there is substantially no illumination. In light squares 116 the illumination is sufficient to saturate good pixels (i.e. to cause the outputs of good pixels to have a maximum value). In the illustrated embodiment, the edges of squares 114 and 116 are aligned exactly with the boundaries between pixels 102 so that all of pixels 102 are entirely within a dark square 114 or a light square 116. For example, if the output values for pixels 102 are represented as 8-bit numbers, good pixels 102 within a dark square 114 may produce an output value of 0 whereas good pixels 102 within a light square 116 may produce an output value of 255.

Ideally if imaging array 100 is without defects then an image which exactly matches the image projected onto imaging array 100 could be reproduced by displaying image data obtained from imaging array 100 on a defect-free display.

Figure 2:
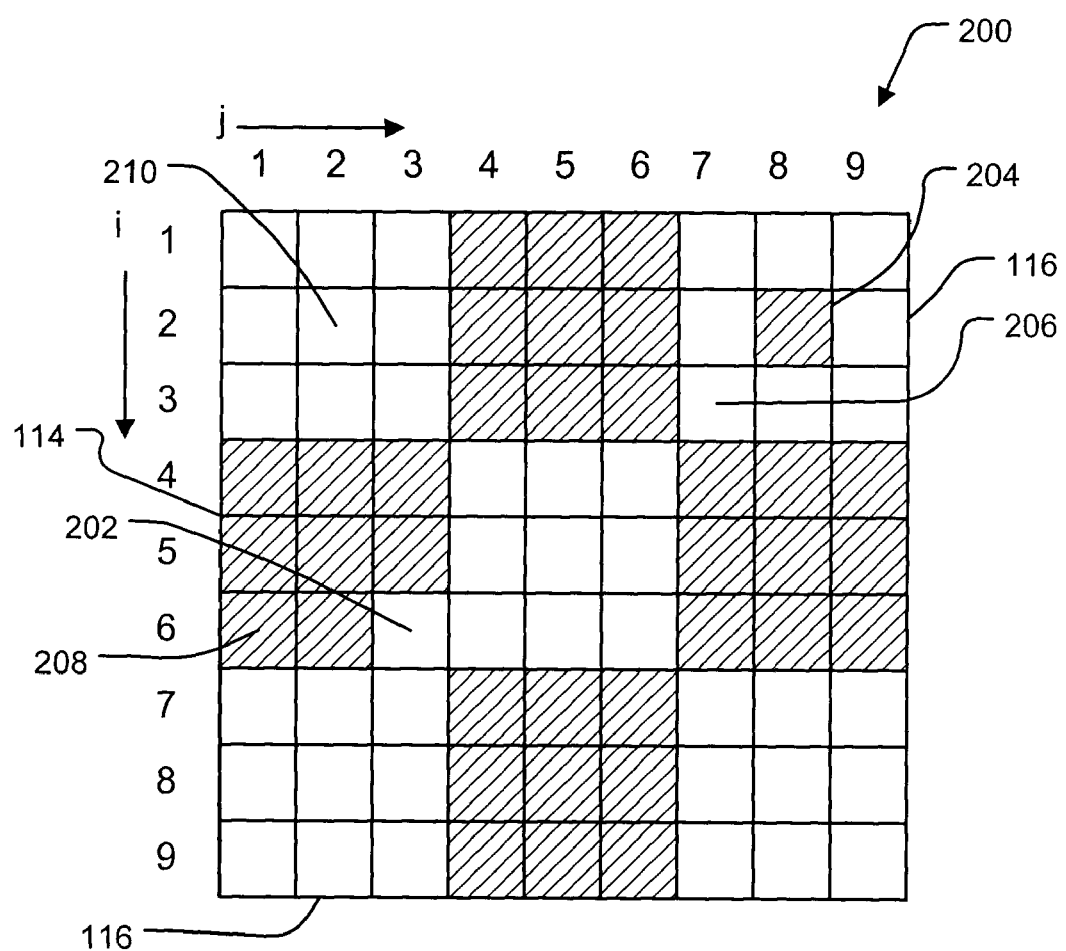
FIG. 2 shows schematically output values for the pixels of the array of FIG. 1 when the array includes some defective pixels that are stuck high and other defective pixels that are stuck low.

FIG. 2 illustrates the effect of some simple defects on pixel values and the difficulty in locating defective pixels in non-uniform images. FIG. 2 shows an image 200 made from pixel values for the imaging array of FIG. 1 in the case where imaging array 100 has four defective pixels. Pixels 202 and 206 are defective and are both stuck high (i.e. are both stuck in a state in which the pixel value indicates a high exposure). Pixels 202 and 206 always output a maximum digital value (e.g. 255 for an 8-bit output). Pixels 204 and 208 are defective and are both stuck low (i.e. are both stuck in a state in which the pixel value indicates low exposure). Pixels 204 and 208 always output a minimum digital value (e.g. 0).

For properly-operating pixels, such as pixel 210, image 200 is correct. A pixel, such as pixel 202, that is in a dark square 114 but is stuck high will cause a bright spot 202 at a location in image 200 that should be dark. Similarly a pixel, such as pixel 204, that is located in a light square 116 but is stuck low will cause a dark spot 204 at a location in image 200 that should be light.

The difficulty of detecting defective pixels by observing normal images is illustrated by defective pixel 206 which is located in a light square 116. By coincidence, the output of pixel 206 has the correct value, even though the pixel is defective (stuck high). Similarly, the output of pixel 208 is properly at the minimum value, even though the pixel is defective (stuck low). Because of their locations relative to the checkerboard image, pixels 206 and 208 would produce the same output values if they were not defective as they produce in their respective defective conditions.

The difficulty of identifying defective pixels from normal images is compounded because:

In practice normal images have a much wider distribution of illumination levels, including more complicated and random image patterns than the checkerboard image of FIGS. 1 and 2.

The outputs of pixels, whether the pixels are good or defective, tend to carry noise. The noise results in output values that change by the addition of random noise from image to image.

Pixels, such as high-sensitivity pixels or hot pixels, that are defective in ways that are more complicated than being stuck high or stuck low may have complicated responses to illumination.

Figure 3:
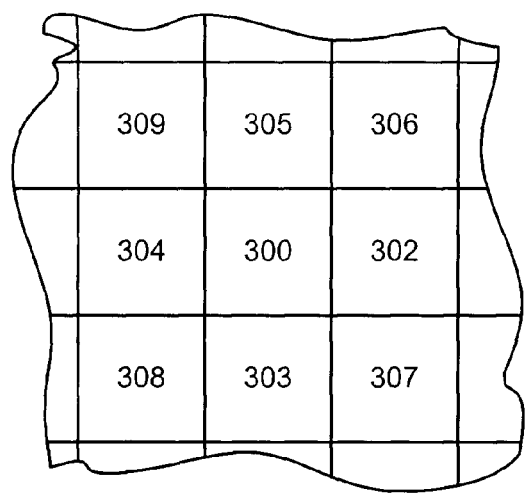
FIG. 3 shows schematically a part of an imaging array that includes a pixel and its eight nearest neighbours.

FIG. 3 illustrates a pixel 301 in an imaging array 300 surrounded by its nearest-neighbour pixels. Pixels 302, 303, 304, and 305, are the closest nearest-neighbours of pixel 301. Pixels 306, 307, 308 and 309 are diagonal nearest-neighbours of pixel 301. If pixel 301 is known to be defective, the resulting image may be corrected by replacing the value of pixel 301 with an estimate of the correct value. The estimate may be calculated by averaging the values of nearest-neighbour pixels of pixel 301. For example, the value for pixel 301 could be replaced with the average of the values for some or all of closest nearest-neighbour pixels 302, 303, 304, and 305 or the average of the values of some or all of the nearest neighbour pixels 302 to 309. An estimate of the value for a defective pixel 301 may also be obtained by taking weighted averages that apply specific weighting values to the nearest-neighbour pixel values. For example, spline fits, biquadric or Gaussian weighting, or adaptive schemes which adjust the weights based on the image information could be applied to obtain an estimated value for pixel 301.

Such correction methods can work well if the intensity of illumination is changing slowly in the area surrounding pixel 301. Such correction methods can be unsatisfactory in cases where the intensity of illumination changes sharply in the vicinity of pixel 301. Sharp changes in illumination occur, for example, at the edges of objects depicted in images.

Figure 4:
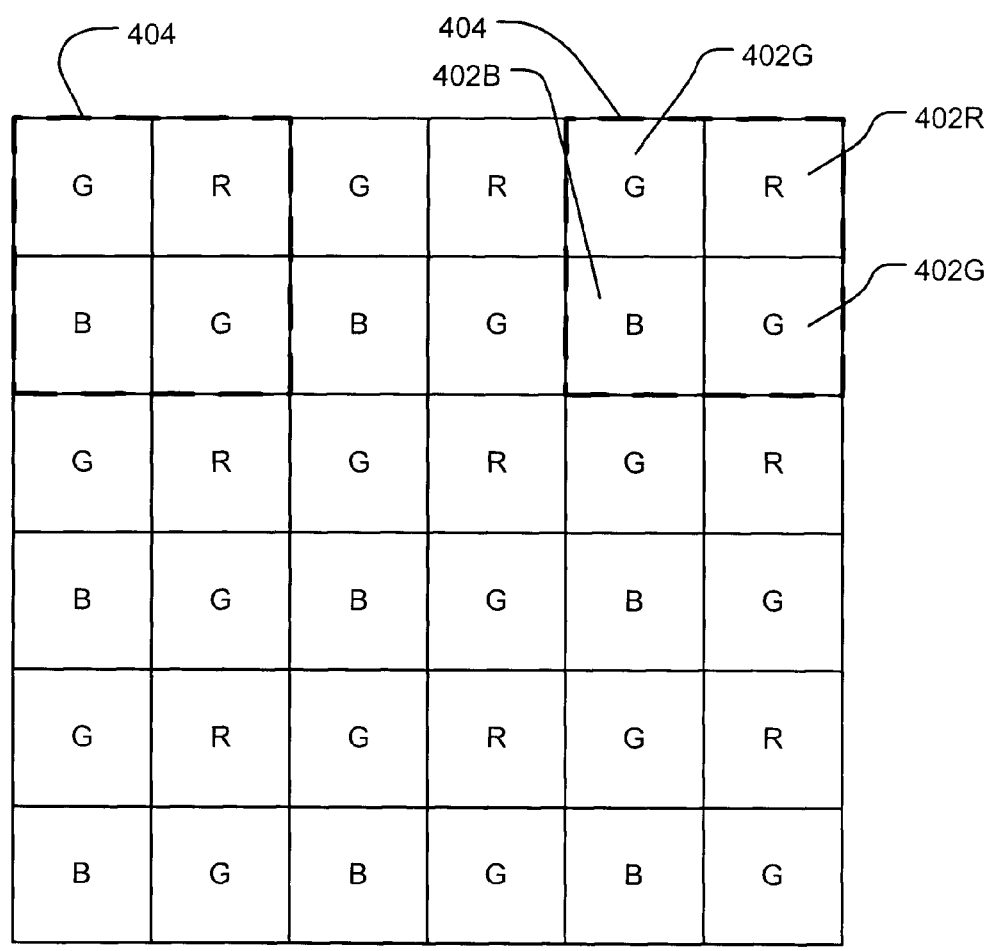
FIG. 4 shows schematically a part of a prior art colour imaging array having pixels arranged in a Bayer matrix pattern.

FIG. 4 shows an example colour imaging array 400 that has pixels 402 arranged in a Bayer matrix pattern or Bayer pattern colour filter array ("CFA") to obtain colour images. Pixels 402 include pixels 402R sensitive to red light, pixels 402G sensitive to green light, and pixels 402B sensitive to blue light. In the Bayer CFA, pixels 402 are arranged in 2×2 pixel blocks 404 which are repeated across imaging array 400. Each block 404 comprises one red pixel 402R, one blue pixel 402B and two green pixels 402G and 402G located diagonally relative to one another.

The raw data from colour imaging array 400 typically contains data for each pixel 402. Raw data formats (sometimes called "digital raw files") store these pixel values. However, many data formats used for storing image data do not retain the raw pixel data. For example, in creating digital data files in many image file formats the raw pixel values are used as inputs to colour interpolation or demosaicing algorithms. These algorithms are typically executed by a processor in the imaging system.

Colour interpolation algorithms may compute interpolated values for colours to which a pixel is not sensitive based upon values measured by neighbouring pixels that are sensitive to those colours. In the illustrated example, each pixel measures a value for one colour. A colour interpolation algorithm may be applied to obtain interpolated values for each of the two other colours for that pixel.

Thus, blue and green interpolated colour information may be computed for each red pixel 402R, red and green interpolated colour information may be computed for each blue pixel 402B, and red and blue interpolated colour information may be computed for each green pixel 402G. This generates a full set of three colour values for every pixel even though the pixel measures only one colour at the location of the pixel. In the course of storing image data an imaging system may also make other alterations to the raw data. For example, the imaging system may process the image data to perform any one or more of the following:

reduce background noise;
    white balance the image to compensate for the colour temperature of the light source;
    adjust contrast; and
    adjust colour saturation.

These changes to the data may also be done by external computers or systems processing the raw data obtained from the imaging array. In the presence of defective pixels these algorithms may magnify the effect of a single defect. For example, a defective pixel of one colour, e.g. red, can cause an incorrect colour interpolation of that colour for surrounding pixels of other colours (e.g. blue and green).

A method for detecting defective pixels will now be described. The method may detect defects of a number of different types. A mathematical model is provided for each defect type that the method will detect (including the fault-free defect type-which may also be called the "good" or "normal" defect type). The mathematical model describes how a pixel having a defect of the type corresponding to the model would be expected to respond to the full range of illumination intensities. Practitioners skilled in the art understand that even defective pixels may have noise. The mathematical models may take into account expected noise in the pixel output values. The mathematical models may optionally include noise models.

In some embodiments, the methods apply the mathematical models to evaluate the probability that, if a pixel has a defect of the type being modelled, the pixel would produce a particular output value. A mathematical model may be represented as a set of probabilities with a probability specified for each possible pixel output value. The mathematical model may be stored as a function, a lookup table, or the like. For at least some defect types, the probabilities are based, at least in part, on statistics of an image being analysed. Where a pixel with a particular type of defect cannot produce certain output values then the probability may be zero for such values. For example, the probability that a stuck-low pixel could produce an output of 255 is 0%.

As examples of some defect models:

A "dead" or "stuck-low" pixel responds to all light intensities with an output of nearly zero. In the simplest model, a stuck-low pixel would respond to all light illuminations with an output value of zero. Hence it would have a probability of 100% for having a value of zero, and probability of zero for all other values. A more realistic model for stuck-low pixels would still show no response to any illumination level, but include a range of digital values which stuck-low pixels could generate. The probability of a stuck-low pixel having values within that range would depend on the noise model for the pixel. With a uniform noise model, all values within the range of 0 to some small stuck-low maximum would be equally likely, while all probabilities above the stuck-low maximum would have zero probability. Those skilled in the art will understand that more complicated noise models could include probability distributions of noise, such as Gaussian distributions.

A stuck-high pixel responds to all illumination levels with an output value near maximum. In the simplest mathematical model, a stuck-high pixel would respond to all light illuminations with a maximum output value (e.g. a value of 255). With the incorporation of a noise model, stuck-high pixels could have values within a range of probable values from the maximum value (255 in the embodiment with 8-bit digital data), down to some stuck-high lower limit.

The mathematical model for a high-sensitivity pixel specifies a change in output value from a minimum value to saturation over a smaller illumination range than a typical pixel. The high-sensitivity pixel may stay saturated for all illumination levels higher than some threshold level. A mathematical model for the expected behaviour of a high-sensitivity pixel may also include a noise distribution.

Pixels may have defects that result in unusually low sensitivity. For example, in some types of imaging array, pixels may fail in such a way that they are half-sensitive. Such defective pixels provide output values for a given illumination that are reduced to 50% of the output value expected for a good pixel. A mathematical model for the expected behaviour of a low-sensitivity pixel would provide that the pixel produces output values between zero and some maximum value, which is less than the allowed digital maximum at full illumination. A pixel having a half-sensitivity defect would respond over the entire illumination range but would have zero probability of having values greater than one half of the maximum. In more complicated models, noise probability distributions can be added to this simple case.

A pixel may have a defect that results in the output value of the pixel being offset by some fixed amount.

Other pixel defects may cause the pixel to vary with respect to other photographic or environment variables that are independent of illumination. One such example is a "hot" pixel defect, which causes a pixel's output to increase with increasing exposure duration even if there is no incident illumination. Pixels may conceivably respond to changes in other parameters, such as temperature and so on. These parameters are typically measured and recorded by a camera or other apparatus during operation, where the data may apply to individual pixels, collections of pixels, or the entire array simultaneously. As such, information such as exposure time may be loaded and processed by this algorithm/apparatus in the same way as incident illumination is loaded and processed for each pixel location.

Mathematical models may be provided for more complicated defect types, such as defects that cause the output from a pixel to have some combination of offset and/or change in sensitivity over some or all of the range of input illumination.

A "good" of "fault-free" pixel can have any value between minimum and maximum.

There are many defect types and models which may be implemented, but they in general divide into defects that are not affected by the illumination as in the stuck-low case and defects that have some response to illumination levels. The mathematical defect model may be based in part upon statistics of individual images.

Those skilled in the art will recognize that imaging arrays often have calibration or sensitivity values applied to each pixel. These calibration values compensate for variations in sensitivity among the pixels of an imaging array. Such variations can arise during fabrication of an imaging array. The calibration values are chosen to cause the output values for each pixel to be within a desired digital range in response to a specified illumination level. Where a pixel experiences a significant change in its response characteristics the calibration value for the pixel may no longer be appropriate. For example, the pixel may perform as a high-sensitivity pixel or as a low-sensitivity pixel depending upon the nature of the change in sensitivity.

In a simple example embodiment of the invention a method may attempt to identify pixels that are stuck-low, stuck-high and fault-free. In another example embodiment of the invention, the method may attempt to identify pixels that are stuck-low, stuck-high, fault-free and any or all of hot, high-sensitivity and low-sensitivity. In general, the method attempts to identify pixels of at least one defect type other than "good".

Figure 5:
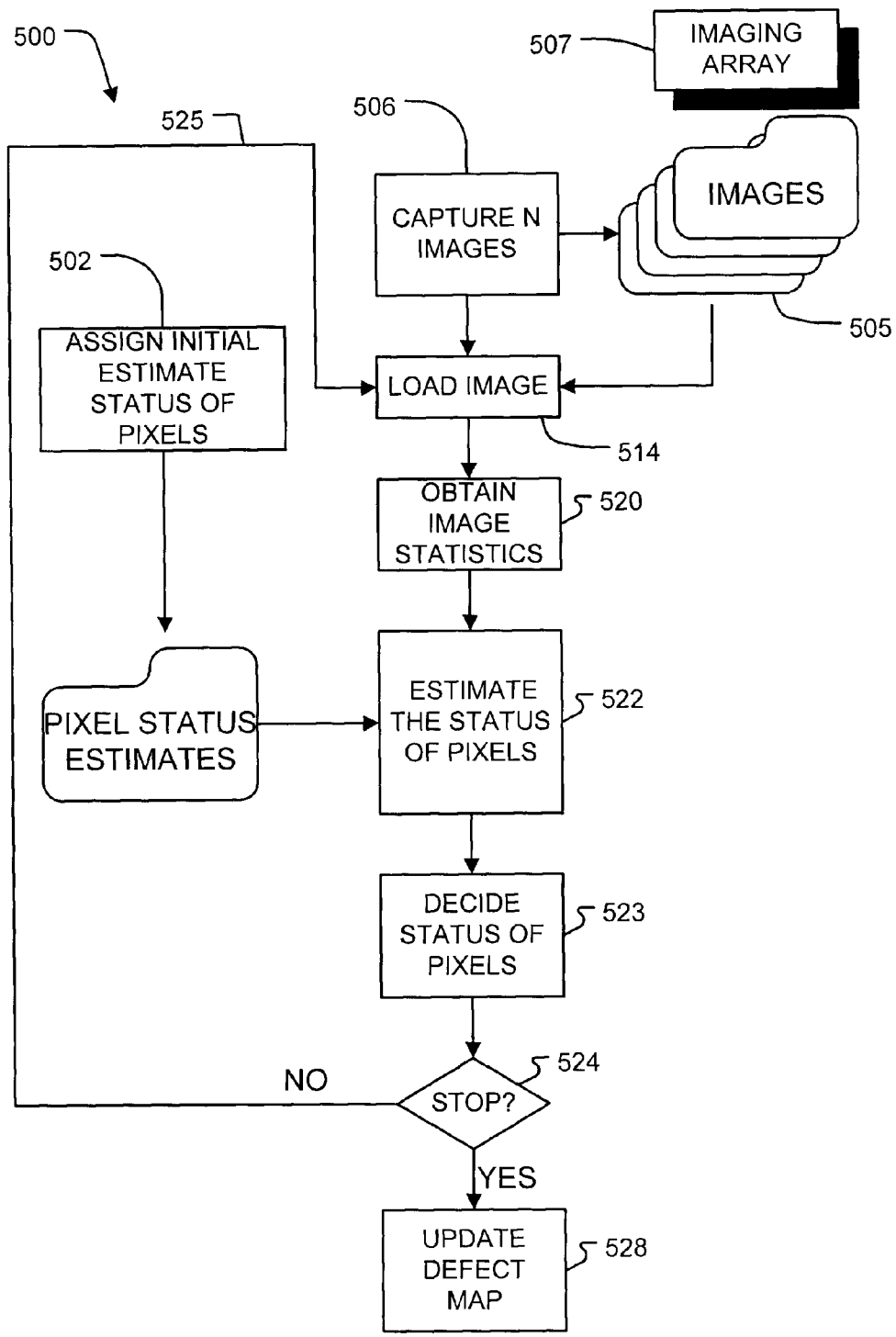
FIGS. 5, 5A and 5B are flow diagrams illustrating methods according to embodiments of the invention.

FIG. 5 is a flow chart that illustrates a method 500 according to an embodiment of the invention. The steps of method 500 may be performed within an imaging system, such as a camera, X-ray machine or the like, or may be performed in an external data processor. The method steps may be performed by a data processor executing suitable software instructions or performed in specialized hardware or in any suitable combination of hardware and software. In block 506, method 500 obtains a number of images 505 taken with the imaging array 507 to be tested.

Method 500 is described for monochrome imaging arrays producing monochrome images. In the case of multi-spectral or multi-channel images, such as colour images, method 500 may be repeated for each colour or channel. For a multi-channel colour array, each physical pixel site on the sensor may only be sensitive to a subset of the wavelengths detected by the entire sensor (e.g. the Bayer CFA) in which case, preferably, raw data from each pixel is used and each colour plane is treated separately as if it were an individual imaging array. Where the raw data is not readily available, 3 colour information from a regular JPEG, TIFF, or other file format may be used in the practice of the methods described herein.

Method 500 uses image statistics, such as the distribution of pixel values in each of a plurality of images 505 to estimate the probability that each pixel is defective in a given way. For each image 505, the statistical distribution of the pixel intensity values is collected, for example in a histogram. The histogram may be used to provide an estimate of the probability that a good pixel in an image will have a value within a given intensity range. It is convenient but not necessary to provide a single histogram for all pixel values in an image 505. As an alternative, one could provide separate histograms for different areas within an image 505 or for different spectral components (e.g. different colours) in image 505.

Method 500 sets an initial probability for each defect type (including the defect-free defect type) for each pixel. As images are processed, method 500 determines the probability that the given pixel can properly be categorized as having each defect type. This determination is based upon:
the value of the given pixel;
a model of expected pixel behaviour for each defect type; and,
image statistics.

For at least some defect types, the probability that the given pixel would have the observed value if the pixel had the defect type is determined based on the image statistics and the model of expected pixel behaviour. Method 500 may apply Bayesian statistics to compute probabilities that the given pixel can properly be categorized as having each defect type.

In block 506 method 500 obtains a set of images 505 captured by the imaging array 507 to be tested. Obtaining the images may comprise taking the images, retrieving the images from a data store, importing the images into an external computing device, such an external computer (such as a personal computer ("PC")), or the like. The images are not identical to one another. Where the imaging system comprises a camera, each image may comprise a digital photograph taken by the camera. Where the imaging system comprises an X-ray machine, each image may comprise an X-ray taken by the X-ray machine. It is not necessary that the images be high-quality images or that the images even be in focus.

The number, N, of images 505 in the set is chosen to be at least equal to a minimum number. The minimum number may be determined with reference to the number of tests required for detecting pixel defects with a desired accuracy. For example, in some embodiments, simple defects may be located to a reasonable degree of probability by analysing ten or so images. To detect more complicated pixel defects and/or to identify defective pixels with greater certainty it may be desirable to analyse a larger number of images, for example a few hundred images.

In block 502, for each pixel in the imaging array, an initial probability is assigned to the possibility that the pixel contains a defect of each considered type. The initial probabilities may be based in whole or in part on knowledge such as the array design, calibration information, or behaviour of other similar arrays. For example, the initial probabilities may be based on any of:

Statistics available at the time of manufacture (for example, it may be known that for a certain manufacturing process 0.01% of pixels will likely have a defect of a certain type).

Test results from calibration data. The calibration data may be obtained at the time of manufacture or later.

Optionally, for cameras or other imaging systems which can capture a dark frame calibration image, the probabilities that certain pixels have defects of certain defect types can be assigned based upon a dark frame calibration image. As discussed above, pixels having defects of certain types (e.g. stuck-high) are readily identifiable in a dark frame calibration image. In these cases, the initial probabilities are also assigned according to this calibration image.

Results from previous runs of method 500.

If no additional information is available, each defect type at a given pixel may be assigned default probabilities. The default probabilities may be, for example, equal for all defect types (including the defect free pixels). The collection of all cases is preferably normalized (i.e. sums to 100% probability).

The initial probabilities may optionally vary with position in the imaging array.

In an example embodiment, block 502 assigns initial probabilities to each of a plurality of defect types. For example, block 502 may assign initial probabilities to the possibilities that a pixel is: stuck-low, stuck-high, or not defective.

Loop 525 comprising blocks 514 to 524 is then executed for each image 505 in the set (until the termination conditions of block 524 are satisfied). In block 514 one of the images 505 from the set is selected. The selected image 505 may be loaded into a working memory where it is available for analysis. Blocks 520 to 524 are then performed on the selected image 505.

Instead of performing loop 525 on all pixels of an image 505 at once, loop 525 may be performed on sub-sections of images 505. Loop 525 may be repeated to cover a number of sub-sections that collectively cover the entire array of pixels to be tested.

In block 520 a statistical metric is collected and calculated for the current image 505. The metric is used together with the mathematical models for the defect types being screened for to evaluate a probability that a current pixel suffers from one of the defect types. The statistical metric may be any measure that readily highlights deviations in pixel output from expected values.

In some embodiments, the metric comprises a probability histogram. The probability histogram may be like that shown in FIG. 6 or FIG. 7. In colour, or multi-spectral images a separate histogram is preferably provided for each colour band. For typical colour images, the histograms for different colours typically have different shapes.

Figure 6:
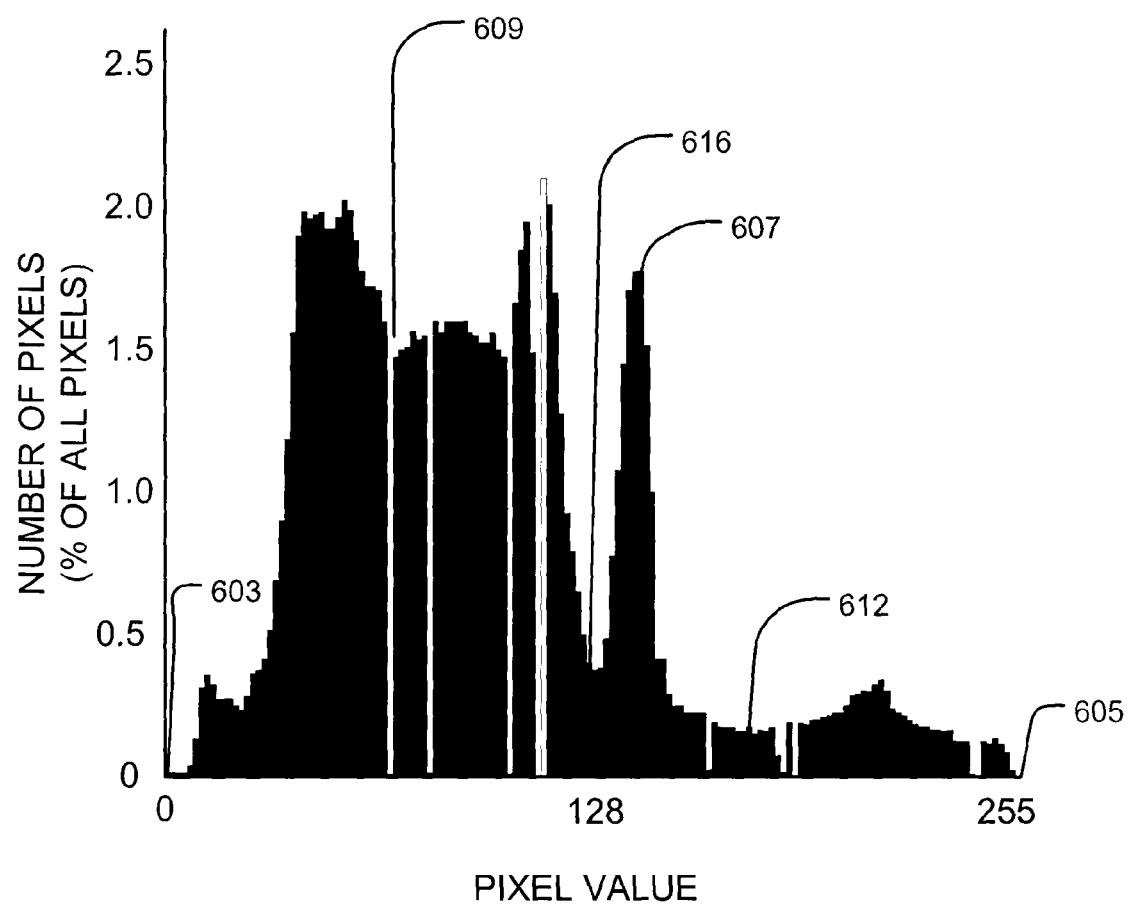
FIG. 6 is an example histogram showing the statistical distribution of pixel values for a sample image and illustrating the presence of holes or dropouts in the histogram.

Block 520 may involve obtaining the set of all pixel values from the image 505 (or portion of image 505) being considered. FIG. 6 shows an example of pixel statistical information or histogram for an image. This example shows 8-bit digital data having values (also called bins) ranging from 0 (bin 603) to 255 (bin 605). The vertical lines or "bins" in FIG. 6 each represent the proportion of pixels in the image 505 that have outputs equal to a particular value. For example, bin 607 indicates that about 1.7% of the pixels in the image have the value 133. It is not mandatory that each bin contain only one pixel value. A histogram could be constructed such that a few pixel values are assigned to each bin.

The percentage for each bin is equal to the probability that a pixel in the image will have a value corresponding to the bin. FIG. 6 shows a typical case where most of the pixels have values well away from the extreme values (0 and 255 in this example). Thus there is a low probability that a pixel will have a value of 0 (pixels of value 0 will be counted in bin 603). A value of 0 is consistent with the pixel being stuck-low. There is also a low probability that a pixel will have a maximum value (pixels of the maximum value will be counted in bin 605). A maximum value (255 in this example) is consistent with the pixel being stuck-high.

The data represented in FIG. 6 has dropouts at various pixel values. A dropout is a bin for a value intermediate bins 603 and 605 for which there is a very low or zero probability. Bin 609, which corresponds to the value 66, is an example of a dropout. Dropouts may be caused by the digitization of the image statistics or by the content of the image. However, often dropouts are caused by the way in which adjustments for contrast, colour interpolation, colour balance or colour saturation are made while processing raw pixel data to yield the image data being used. Since dropouts are often created by the digitization process or camera setting adjustments, they may not represent the real distribution of pixel intensity probabilities in the raw image.

Figure 7:
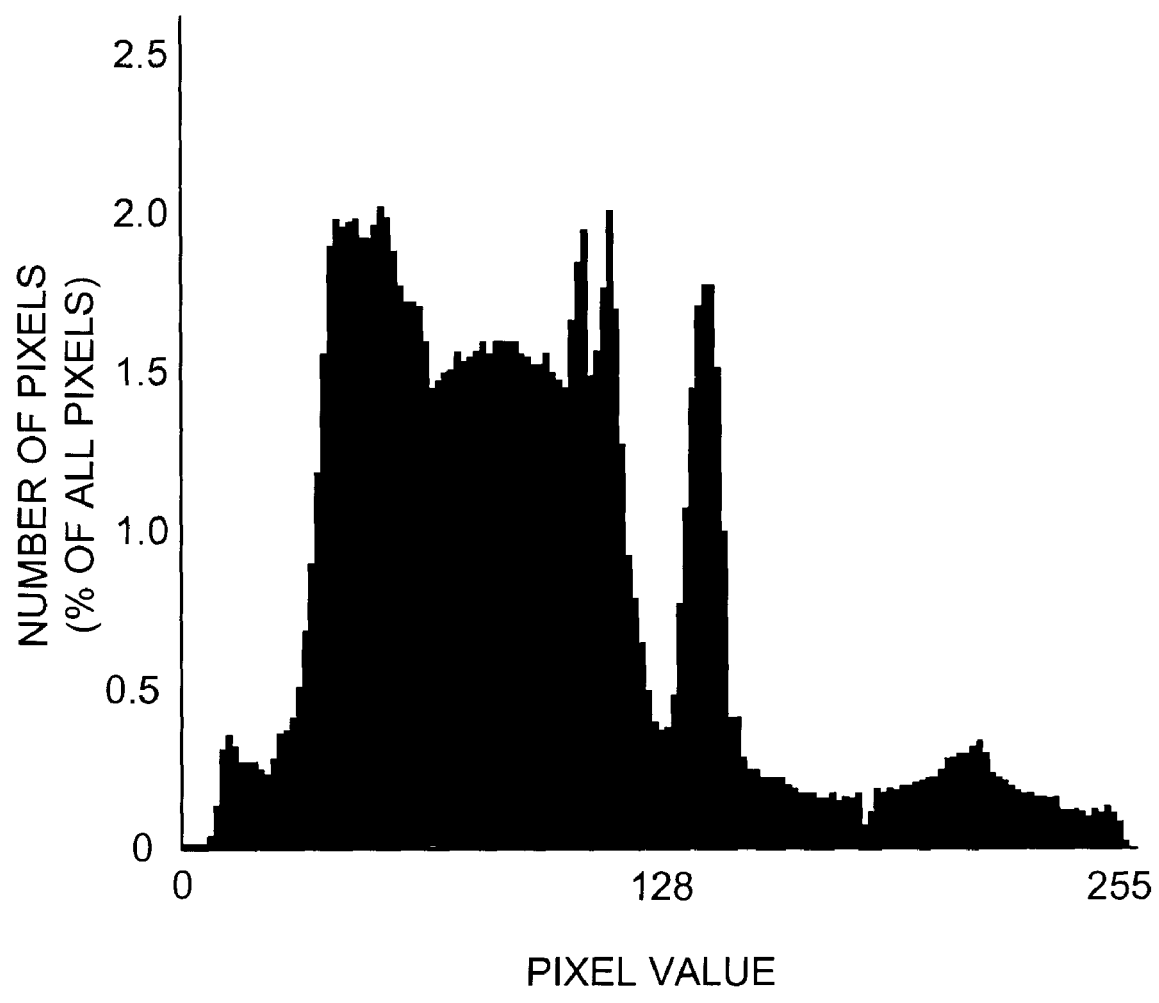
FIG. 7 is a smoothed version of the histogram of FIG. 6.

It is preferable to modify the statistical pixel data to remove dropouts. The existence of dropouts can complicate subsequent calculations. FIG. 7 shows an example of the histogram of FIG. 6 that has been modified to remove dropouts. Dropouts may be removed, for example, by applying a simple averaging filter or by more complex operations that also take into account noise generated at each pixel. The algorithm applied to remove dropouts should not significantly affect large areas of the histogram that have low percentages such as areas 612 and 616. Such large areas typically represent real characteristics of an image as opposed to artifacts introduced by digitization or other processing applied to raw image data.

In some embodiments, the probability of any pixel taking on a particular value is collected (as described above with reference to FIG. 6). The set of such values corresponds directly to the image histogram commonly calculated by many imaging applications. Such a histogram may be used directly as a statistical metric. Block 520 may comprise importing an image histogram for the current image that has been prepared for some imaging application.

Block 522 determines, for each pixel location within the whole image 505 (or sub-section of the image 505 being operated on), a probability that the pixel belongs to each of the modelled defect types. Block 522 may be performed using Bayesian inferences. In this case, Bayesian statistics are used to update the probability that the pixel under consideration belongs to each of the modelled defect types.

A particular embodiment of block 522 applies a mathematical model for each defect type under consideration. The mathematical model is used together with the observed pixel values to evaluate a conditional probability that the pixel has the modelled defect. The conditional probability is then combined with the prior probability that the pixel has a defect of the type in question to yield an updated estimate of the likelihood that the pixel under consideration is affected by the modelled defect. The prior probability may be obtained from the initial probability obtained in block 502 as modified by any previous iterations of loop 525. For some defect types, the conditional probability is based at least in part on the statistical metric generated in block 520.

In some embodiments of the invention the conditional probability is then combined with the prior probability by applying Bayes' theorem:

$$P(H_0 | E) = \frac{P(E | H_0)P(H_0)}{P(E)} \qquad (1)$$

where: $P(H_0)$ is the prior probability that the pixel suffers from the defect; $P(E|H_0)$ is the conditional probability of observing the observed pixel value if the pixel suffers from the defect; $P(E)$ is a normalization factor (in this case, the probability that the pixel will have the observed value based on no other information about whether or not the pixel is defective); and $P(H_0|E)$ is the posterior probability that the pixel suffers from the defect type given the observed pixel value. In some embodiments, $P(E)$ is computed by summing $P(H_i|E) \times P(H_i)$ for every defect type being modelled. Bayesian statistics are known and understood by those skilled in the field.

As an example of the operation of block 522 consider the defect model for a pixel that is stuck-low with uniform noise. In this model the pixel has no response to any illumination level, but due to noise, is equally likely to have any value below a stuck-low maximum. In this example, we use the value 1 for the stuck-low maximum. According to this model, a pixel that is stuck-low has zero probability of having any value above 1 and has a 50% probability of having a value that is either 0 or 1. Because the output of a stuck-low pixel does not vary with illumination level (except to the extent that a noise model may take into account illumination level), the mathematical model for the stuck-low defect is not based upon image statistics.

In block 522 the conditional probability for a stuck-low condition on each pixel is calculated based on the pixel values for the image being processed. If the pixel has a value of 0 or 1 that conditional probability is 50%. If it is 2 or above, the conditional probability is 0%.

If the distribution of pixel values in the image being considered has the distribution illustrated in FIG. 7, which is typical for many types of image, most pixels have a conditional probability for the stuck-low condition of zero. Only a small percentage of pixels have values of 0 or 1. These pixels have a conditional probability of 50% for the stuck-low condition.

Unless a pixel's prior probability for the stuck-low defect type is zero (i.e. the possibility that the pixel is stuck low has already been ruled out), if the pixel has the value 0 or 1, using the conditional probability (50% in this example) in Bayesian inference will result in the current probability (posterior probability) that the pixel has the stuck-low defect type being greater than the prior probability for the stuck-low defect type. For pixels having values other than 0 or 1, the current probability that the pixel is stuck low is reduced to zero.

Some images may have large dark areas (an extreme case of such an image is a dark-field image). Where the current image 505 has large dark areas, a significant number of good pixels will have their stuck-low probabilities increased in block 522. False identification of pixels as having stuck-low defects can be avoided by a suitable combination of:

ensuring that N is sufficiently large,
ensuring that the images 505 used are sufficiently different from one another, and,
setting a suitably high probability threshold for considering a pixel to have a particular defect type.

As FIG. 7 illustrates, when a number of different images are processed, the likelihood that a good pixel will have values of 0 or 1 in all of the images will typically be quite small since only a small proportion of the pixels in each image have values of 0 or 1. Therefore, there is only a very small chance that good pixels will be falsely identified as having the stuck-low defect type.

Consider the case of a pixel whose value is zero in a first image of the set of images being considered. From the histogram of FIG. 7 it can be seen that the conditional probability that the pixel would have a zero output value if the pixel were good is 0.01% (since overall, only 0.01% of the images in the image have the value 0-0.01% is the percentage of pixels having values that are in the zero bin in the histogram). As noted above, if the pixel is stuck low, the probability that it has an output value of zero is 50%.

Consider a simple case where an initial probability for both the stuck-low and good conditions for the pixel are set to 50%. Bayesian methods will adjust the probabilities such that the new posterior probability that this particular pixel has a stuck-low defect may be 99.98% while the probability that it is a good pixel becomes 0.02%. These become the current probabilities for that particular pixel.

Now consider the case where the next image in the set also has image statistics similar to FIG. 7. If the value for the same pixel in the next image is also zero then the conditional probability that the pixel is stuck-low is 50% while the conditional probability that the pixel is good is 0.01%. Applying Bayesian statistics then generates a new posterior probability that the pixel is stuck-low of, for example, 99.999996% while the posterior probability that the pixel is good would be only, for example, 0.000001%. Thus with the processing of each subsequent image in which the pixel has the output value of 0 or 1, the probability of the fault condition (stuck-low in this example) will increase, while the probability of a good pixel condition would decrease.

In contrast, consider the case where the pixel has a value in the second image of 150 corresponding to bin 720 in FIG. 7. In this case, the conditional probability for the stuck-low condition would be 0%, while the conditional probability of the good condition would be 1.6%. Based on these conditional probabilities, Bayesian statistics would generate a new probability of the pixel being stuck-low of 0%, while the probability of the pixel not having the stuck-low defect would rise to 100%.

Thus, over a set of images, for each stuck-low defective pixel, the probability of the stuck-low defect type rises toward 100% while the probability that the pixel has the "good" defect type declines rapidly to near 0%. By comparison, while the probability that a pixel is good may decline in some images (because the pixel has a value that is uncommon in the image) good pixels can quickly recover to give a high probability of a good state, and a 0%, or near 0%, probability for the defective state.

As another example of the application of block 522 consider a pixel that has half the sensitivity of a defect-free pixel. The mathematical defect model in this case takes into account the way the output of the defective pixel changes with illumination levels. For each image histogram in this embodiment the defect response model (in this case a half-sensitivity to illumination) is applied to create a probability histogram for that type of defect for the particular image being processed. For the half sensitivity defect model this will generate a probability distribution determined in part by the image statistics.

For example, if FIG. 7 is the image histogram for the current image 505 then the model for a half-sensitive pixel predicts probabilities like those of FIG. 7 (with the bin-values divided by two) for values below the half-maximum value (128 in this example). In other words, the half-sensitivity model examines the image statistics of FIG. 7 at twice the value of the measured intensity. If a pixel has a half-sensitivity defect, the incident illumination cannot cause a pixel reading to exceed an output value of 128 (half-scale) or greater. Therefore, the model assigns zero probability for higher values (values between 128 and the maximum of 255 in this example).

The actual measured pixel values for the image being processed can use this probability model to calculate the conditional probability that a particular pixel has the half-sensitivity defect. Bayesian inferences may be used to obtain a current probability for the half-sensitivity defect type based upon an initial probability established in block 506 as modified by any previous iterations of loop 525.

Pixels having measured values below 128 will have the probability of the half-sensitivity defect increased in an amount depending on the probability created by the defect model. Pixels having measured values above 128 will have zero probabilities of belonging to the half-sensitivity defect type. As FIG. 7 illustrates, since many pixels have values higher the half maximum point (128) there will be significant number of pixels which will be eliminated in each image from being candidates for having the half-sensitive defect type.

Those skilled the art will recognize that methods other than Bayesian statistics may be used to modify these probabilities. Such methods may be applied in place of Bayesian statistics in alternative embodiments of the invention. Bayesian statistics and some other inference methods are described in MacKay, David *Information Theory, Inference, and Learning Algorithms*, Cambridge University Press, 2003; Berger, J. O. *Statistical Decision Theory and Bayesian Statistics, Second Edition*. Springer Verlag, New York, 1999; and Bolstad, William M. *Introduction to Bayesian Statistics*, John Wiley 2004. Practitioners will also recognize that there are many possible models of low- or high-sensitivity pixels and that in the general case this could be used to generate a recalibration of the sensitivity of all pixels of the imaging array within some limits of accuracy.

Block 523 makes a decision as to the most likely defect type for each pixel after every iteration of loop 525. In a preferred embodiment, this decision is made in favour of the defect type having the highest probability which exceeds a predetermined threshold. For example, if the method is considering four defect types (including the "good" type) then block 523 may declare that a pixel belongs to a particular one of the four defect types when the probability for that defect type exceeds a threshold (such as 99%, for example) and that defect type has a higher probability than any of the other defect types being considered.

In response to block 523 determining that a pixel is defective, method 500 may add the pixel to a defect map. The method may optionally add information regarding the nature of the defect to the defect map.

At the end of each iteration of loop 525 in block 524 a decision may be made whether another image should be analysed. A wide range of criteria may be applied to determine whether or not a further image should be processed. One embodiment tests to see whether the predicted status of all pixels has remained constant over a number, T, of images, and if so, terminates loop 525. An alternative embodiment performs this test more selectively and stops processing individual pixels for which the most-likely defect type has not changed for T images. In some embodiments, loop 525 is run until all N images in the set of images have been analysed, so as to preserve maximum possible accuracy.

In cases where two or more images could possibly be similar to one another it is desirable for method 500 to verify that, overall, the images in the set are sufficiently different from each other to provide reliable statistics. This may be done in any suitable manner. Differences between images may be evaluated, for example, using a difference criteria based upon image statistics or direct image differences. If an image is not sufficiently different from one or more other images in the set, the image may be rejected, the termination condition may be altered to extend the number of images required and/or the probability conditions for termination may be altered.

It can be appreciated that method 500 can relatively rapidly identify whether a pixel is good or has another defect type once an accumulated probability increases beyond some confidence threshold. As a simple example, the probability that a pixel is black in any given image is small but still possible. However, if the same pixel provides a zero output in a sequence of many different images it is very likely that the pixel is defective (a stuck-low pixel) and very unlikely that all of the many different images are coincidentally black at the location of the pixel.

In method 500 as described above, the conditional probability that a pixel has a particular type of defect is evaluated based upon the value output by the pixel. This method tends to work best for detecting simple defects (such as stuck-low or stuck-high).

Figure 5A:
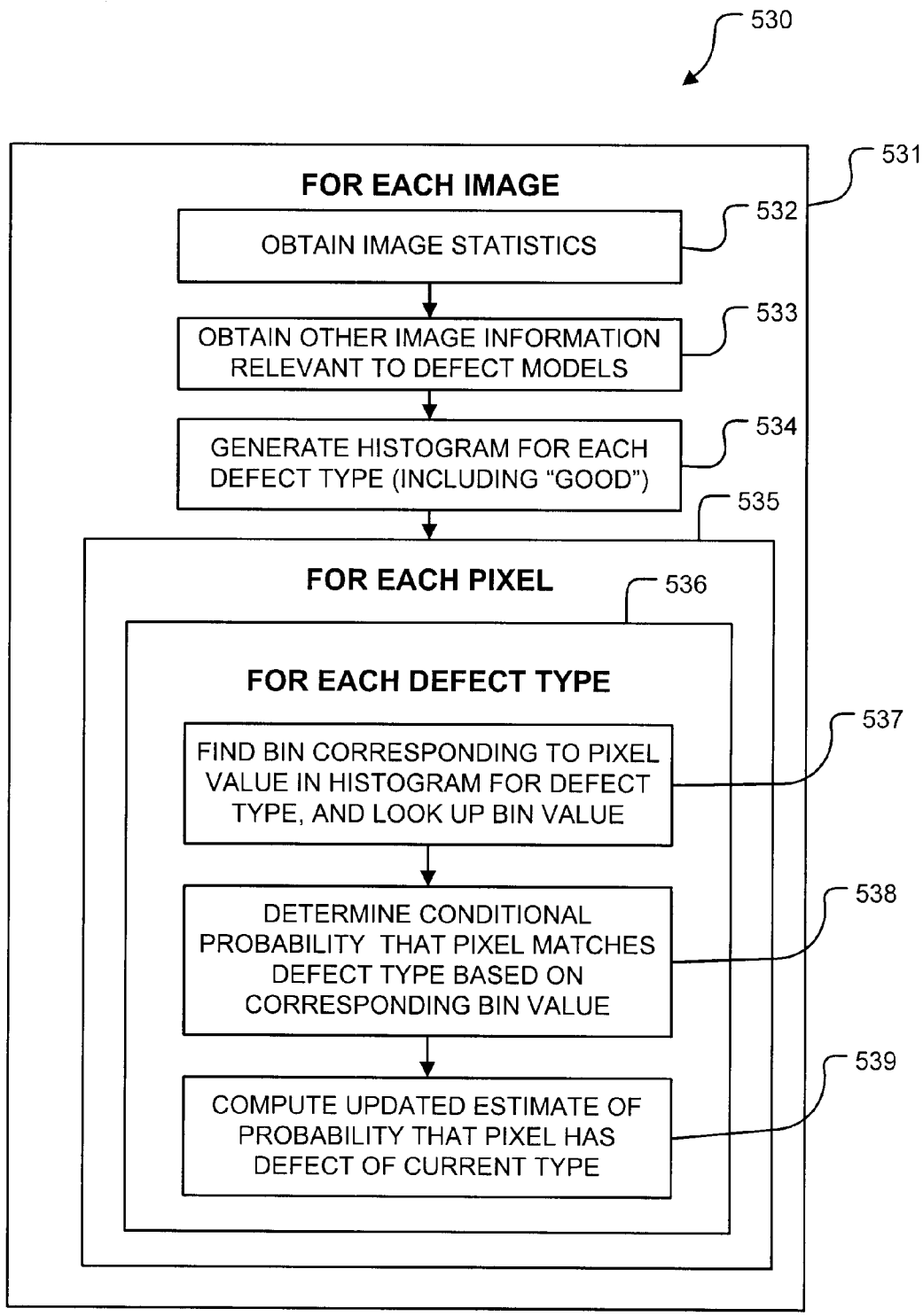

FIG. 5A illustrates a method according to a specific embodiment of the invention wherein statistical information about each image is obtained in the form of a histogram. Block 531 is performed for each image in succession. Block 531 includes obtaining image statistics in block 532 and optionally obtaining other information relevant to exposure time in block 533. The information in block 533 may include information such as the exposure time, ISO setting, or other information that is relevant to one or more of the defect models for defects being tested for. Many cameras automatically record information such as exposure time, ISO setting, date and time and the like and associate that information with each digital image. Block 533 may comprise reading the desired information from a file containing each image.

In block 534 a histogram is created for each defect type. For defect models that do not depend upon exposure or the other information of block 533 (such as models for simple stuck-low or stuck-high defects) the histogram may be the same for all images. For other defect models the histogram will depend upon both a mathematical model of the defect and the image statistics obtained in block 532.

Figure 6A:
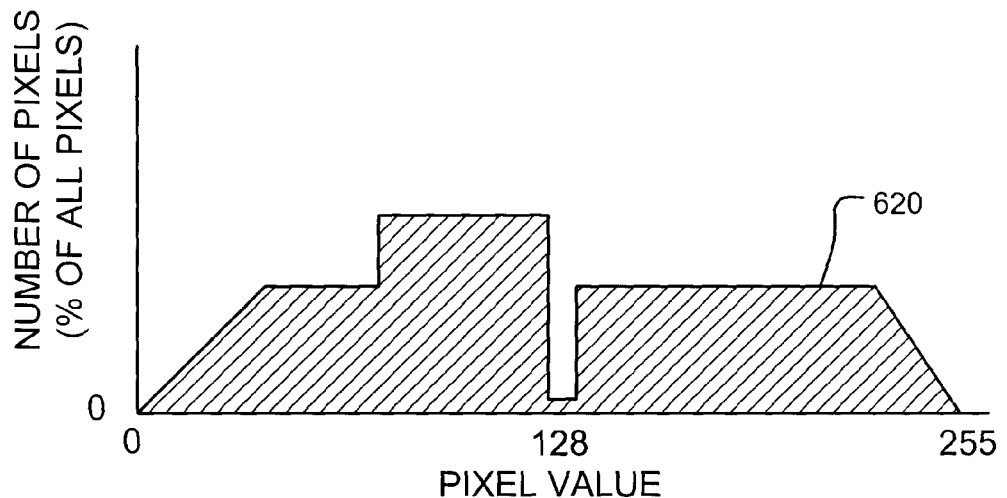
FIGS. 6A through 6E are illustrative example histograms for each of a number of defect types for which a pixel output value varies with illumination level.

Consider the example histogram 620 shown in FIG. 6A. This histogram is not characteristic of any typical images but has been contrived to have distinctive features for purposes of explanation. It is assumed that histogram 620 reasonably-accurately reflects the distribution of intensities at the elements of an imaging array being studied. The following examples show how histogram 620 (which is a type of image statistics) can be used together with mathematical models of different defect types to generate histograms for different defect types. Each histogram indicates the likelihood that a certain output value (or range of output values) will be produced by a pixel having a certain defect type.

Figure 6B:
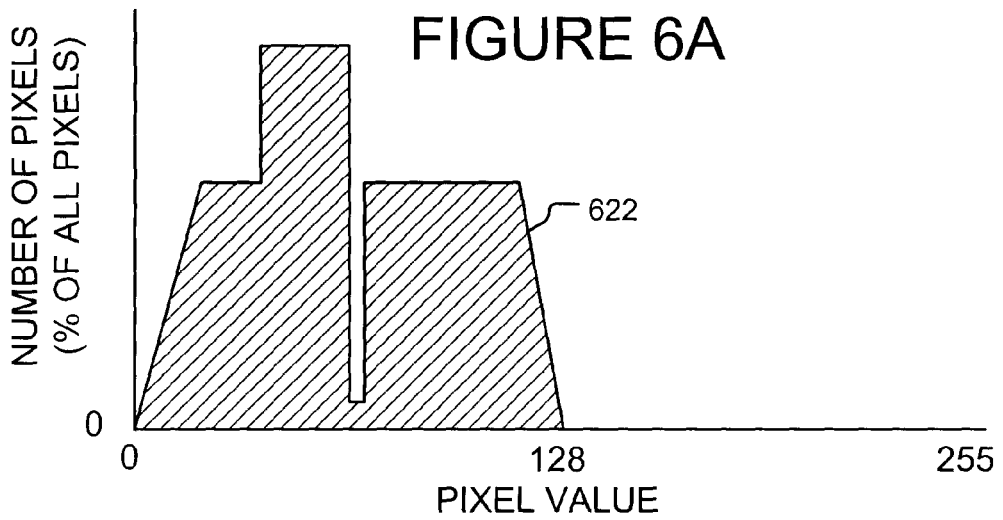

A mathematical model for a half-sensitivity defect may be given by:

$$PV_{half\text{-}sensitivity} = \frac{1}{2}I \quad (2)$$

where: $PV_{half\text{-}sensitivity}$ is the pixel value and I is the intensity of light incident on the pixel. Combining this mathematical model with histogram 620 yields histogram 622 of FIG. 6B. In this example, the half-sensitive pixel is assumed to saturate at a pixel value of 128. Histogram 622 therefore specifies a probability of zero for values above 128. In the range of values 0 to 128, histogram 622 replicates histogram 620 but is compressed along the pixel-value axis (x-axis) and expanded along the probability axis (y-axis). A noise function, such as a Gaussian noise function or other noise distribution could be applied to histogram 622.

Figure 6C:
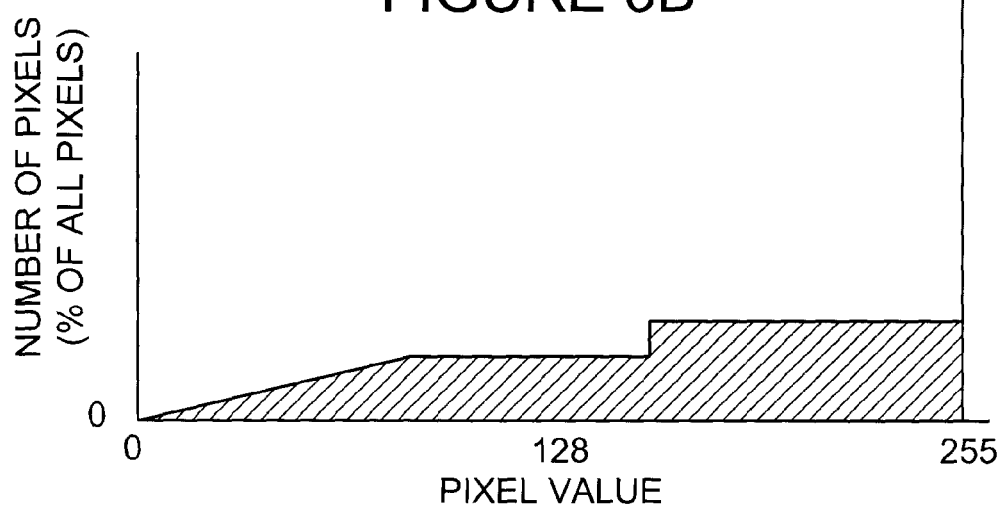

A mathematical model for a high-sensitivity pixel could be represented as follows:

$$PV_{high\text{-}sensitivity} = AI \quad (3)$$

where: $PV_{high\text{-}sensitivity}$ is the pixel value, A>1 is a constant and I is the intensity of light incident on the pixel. FIG. 6C shows a probability histogram 624 for a high-sensitivity defect type for a particular value for A. It can be seen that for pixel values in the range of 0 to 254, histogram 624 is a version of histogram 620 that has been stretched by a factor (A) along the x-axis and compressed in the y-axis. Histogram

624 has a spike at the value 255 since the high-sensitivity pixel saturates at lower intensity than a normal pixel.

Note that the value of A may not be known in advance. To test for high-sensitivity pixels generally, one may create a set of defect models. Each defect model in the set may cover a different range of values for A. Each pixel can then be tested against each defect model in the set. When a high-sensitivity pixel is so tested one would expect that the pixel would show a high probability corresponding to one of the defect models in the set and lower probabilities corresponding to the other defect models in the set. This method may be applied to determine the sensitivities of pixels in an imaging array.

Figure 6D:
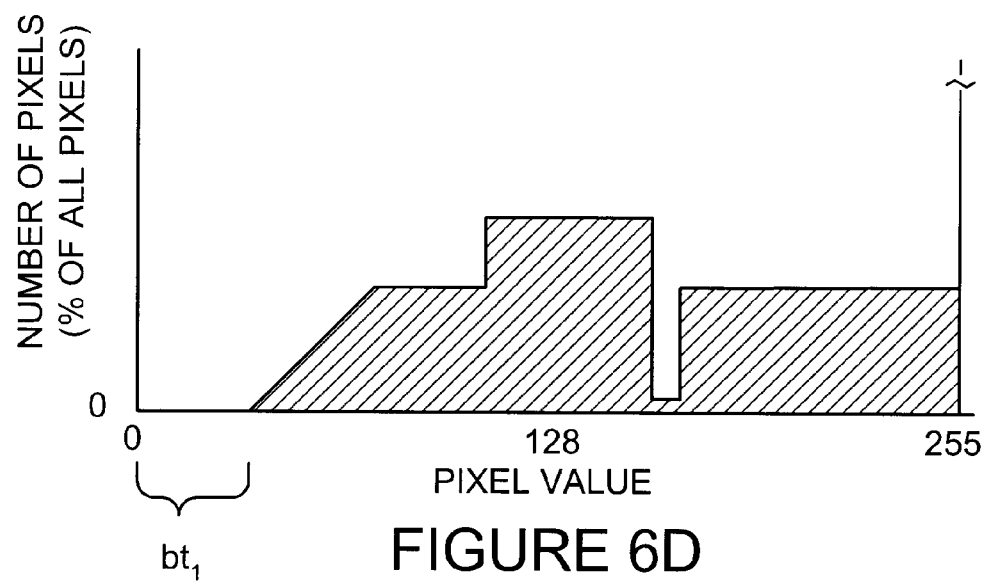
Figure 6E:
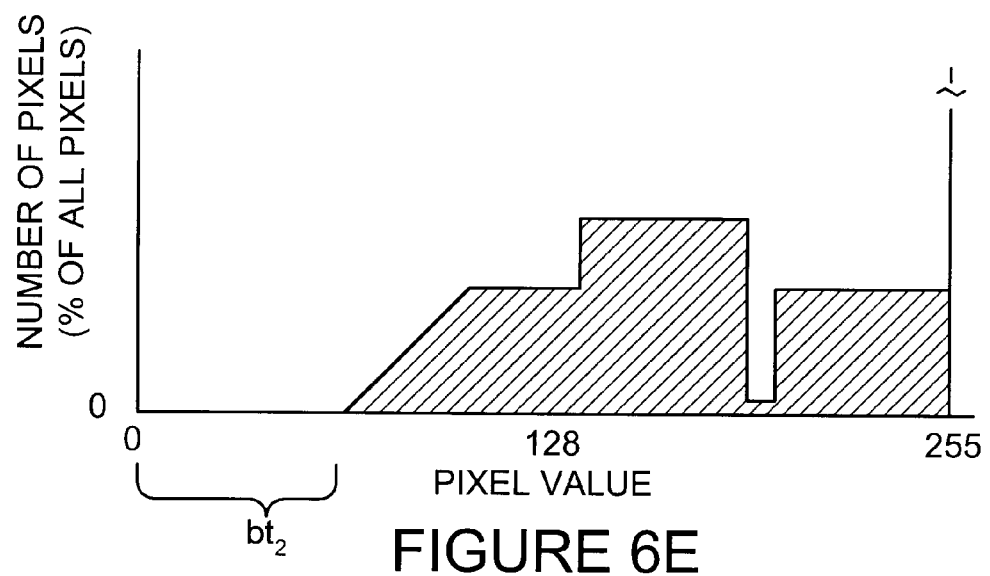

A mathematical model for a hot pixel may be:

$$PV_{hot} = I + bt \quad (4)$$

where: $PV_{hot}$ is the pixel value for the hot pixel, b is a constant and t is the exposure time for an image. FIGS. 6D and 6E respectively show histograms 626 and 628 corresponding to a hot pixel defect type for images having exposure times $t_1$ and $t_2$. It can be seen that the factor bt acts as an offset. In the range of values between 0 and bt, histograms 626 and 628 indicate 0 probability. In the range of values between bt and 254, each of histograms 626 and 628 is a truncated and translated version of histogram 620. Histograms 626 and 628 have spikes at the value 255 since the offset causes hot pixels to saturate at lower intensities than normal pixels would saturate.

It can be seen from FIGS. 6D and 6E that the histogram corresponding to a hot pixel defect type will depend upon the exposure time for the current image. The histogram is based both upon the statistics obtained in block 532 and the exposure information obtained in block 533.

From equation (4) and FIGS. 6D and 6E it can be seen that the histogram for the hot pixel defect type will depend upon the value of b, which may not be known in advance. This can be dealt with by creating a set of histograms, each relating to a different value (or range of values) for b. Collectively, the set of histograms covers a range of values that b might have.

Pixels having defects which cause fixed offsets in the pixel output values can be handled in the same manner as the "hot pixel" defect type. The behaviour of such pixels can be modelled by the equation:

$$PV_{offset} = I + c \quad (5)$$

where $PV_{offset}$ is the pixel output value and c is a constant offset. Similarly to the case of hot pixels, the histogram for the offset pixel defect type will depend upon the value of c, which may not be known in advance. This can be dealt with by creating a set of histograms, each relating to a different value (or range of values) for c. Collectively, the set of histograms covers a range of values that c might have.

Those of skill in the art will understand that the above are only examples of possible defect models. Other defect types may comprise combinations of the above or may have other mathematical models.

Block 535 is repeated for each pixel to be tested. Block 536 is performed for each defect type being tested for. The nesting of blocks 535 and 536 is not critical. All pixels could be tested for one defect type before testing all pixels for the next defect type, each pixel could be tested for several defect types before moving to the next pixel, or some combination thereof. Further, different pixels and/or different defect types could be tested in parallel.

In each case, the pixel value for the current pixel is obtained in block 537 and the corresponding bin value from the histogram corresponding to the current defect model is obtained. In block 538, the conditional probability that the pixel has the current defect type is obtained from the bin value obtained in block 537. In some embodiments the conditional probability is equal to the bin value. Block 539 computes an updated estimate of the probability that the current pixel has the current defect type by, for example, combining the conditional probability with previously-determined conditional probabilities according to Bayesian statistics.

In addition to or instead of evaluating conditional probabilities for defect types based on the output value of a pixel, it is also possible to estimate each pixel's value based on information from surrounding pixels. The estimates can be compared to the measured pixel value. The relationship between the measured and estimated values can be used to estimate the probability that a pixel has a particular type of defect. The estimate of a pixel's value may be made using interpolation techniques or other suitable estimation methods, of which a wide range are known to those skilled in the art. All suitable interpolation and estimation techniques are referred to herein as interpolations. Interpolations can work well at predicting pixel values for many areas of typical images but can be inaccurate in areas where an image changes rapidly (e.g. near edges of objects).

A simple interpolation method computes the unweighted average values of the four nearest neighbours (see FIG. 3). This simple interpolation will give good estimates in many image locations but is inaccurate at object edges or where the image changes rapidly. More complex interpolations, such as spline fits or weighted averages, base interpolated values on some model of how the image is changing and hence can give more accurate, and more highly peaked error histograms. Such interpolations can produce a low level of large errors when the underlying model is a poor fit to the image in question. The possible existence of some such large interpolation errors should be taken into account, especially as some of those errors may coincide with defective pixels.

As more images are examined, the probability of a pixel having a given defect type is modified so that defective pixels can be rapidly identified. As a simple example, consider the half-sensitivity defect discussed above. The likelihood that, in a typical image, the measured output value for a properly-functioning pixel will happen to have a value that is half of the interpolated value is small, but finite. However the likelihood that the pixel output value will be half of the interpolated value in many different images is negligible unless the pixel has a half-sensitivity defect.

Performing interpolations introduces additional computation but provides advantages in the speed at which more complex defects (e.g. pixels with low sensitivity) can be identified. False positives are avoided by basing determinations that pixels are defective upon sets of images and the expected response of defect models for each image's statistics.

In interpolation methods, a histogram of the differences between measured and interpolated pixel values may be used as a basis for establishing the probability that a pixel is "good" or the probability that the pixel has a specified defect.

Figure 8:
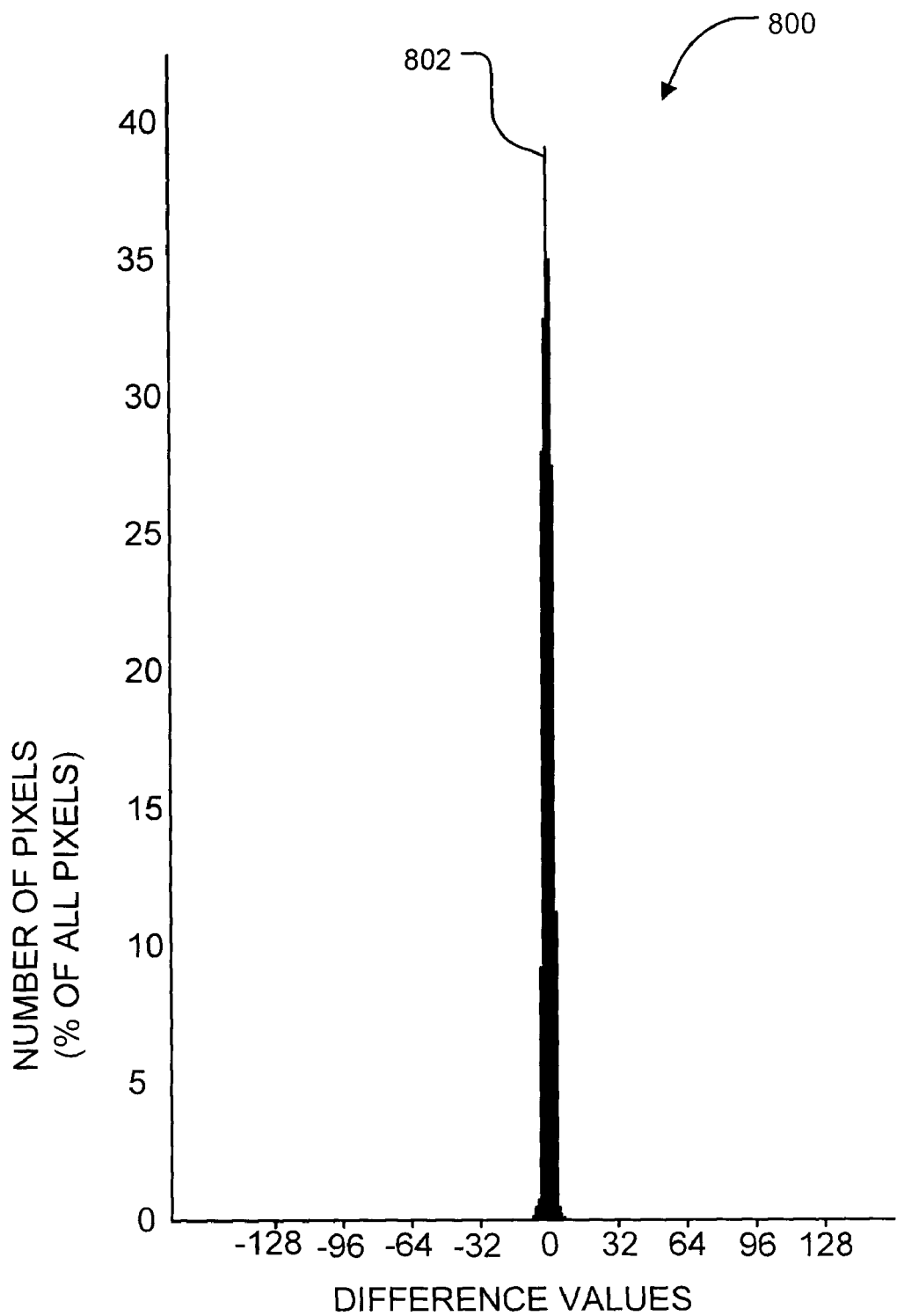
FIG. 8 is an example histogram of differences (or "errors") between interpolated and actual pixel values; and, FIG. 9 is schematic view of a system for identifying pixel defects according to an embodiment of the invention.

FIG. 8 shows an example difference histogram 800 which may be used together with interpolated and actual pixel values for an image to evaluate the conditional probability that a pixel is defective. Histogram 800 has bins for different values of the difference between the actual and interpolated values for the pixels in an image. Histogram 800 has a peak 802 at the bin for 0 difference between actual and interpolated pixel values. Even in images made by defect-free imaging arrays, interpolation introduces its own error, as illustrated by spread of histogram 800 about the central or "zero" bin 802.

The amount of spread will depend on the interpolation method used and upon how well that interpolation method predicts pixel values for a particular image. Where the interpolation method used is very good at predicting pixel values in an image then the difference histogram for that image will have a very narrow distribution. If the interpolation method does not predict accurately the values of a significant number of pixels in the image then the peak of the difference histogram will be wider.

A probability that a pixel is good can be determined by looking up the percentage value corresponding to the bin in which the difference between the pixel's measured and interpolated values. For example, where the histogram of FIG. 8 applies, a pixel having a difference value of 0 indicates a 40% probability of belonging to the "good" defect type. If the pixel has a difference value that is far from zero then the probability that the pixel is good will be very small.

The probability that a pixel has a particular defect type can be determined by applying a compensation function to the measured pixel value to yield a compensated pixel value, computing a difference between the compensated and interpolated pixel values and determining the probability from the difference histogram. The compensation function is chosen to compensate for the defect. For example, in the case where the defect being tested for is a half-sensitivity defect, the compensation function may comprise multiplication by two. If the difference between the pixel's compensated and interpolated values is small then there is a significant probability that the pixel belongs to the defect type in question (in this example, the half-sensitivity defect type). Otherwise there is a much lower probability that the pixel belongs to the defect type.

If necessary, a histogram of the type shown in FIG. 8 may be processed to remove dropouts as described above in relation to FIG. 6. Also, it is desirable that the probabilities in each bin of the histogram be finite and non-zero. This can be achieved by adding a small probability value to any bin having a value of zero.

Figure 5B:
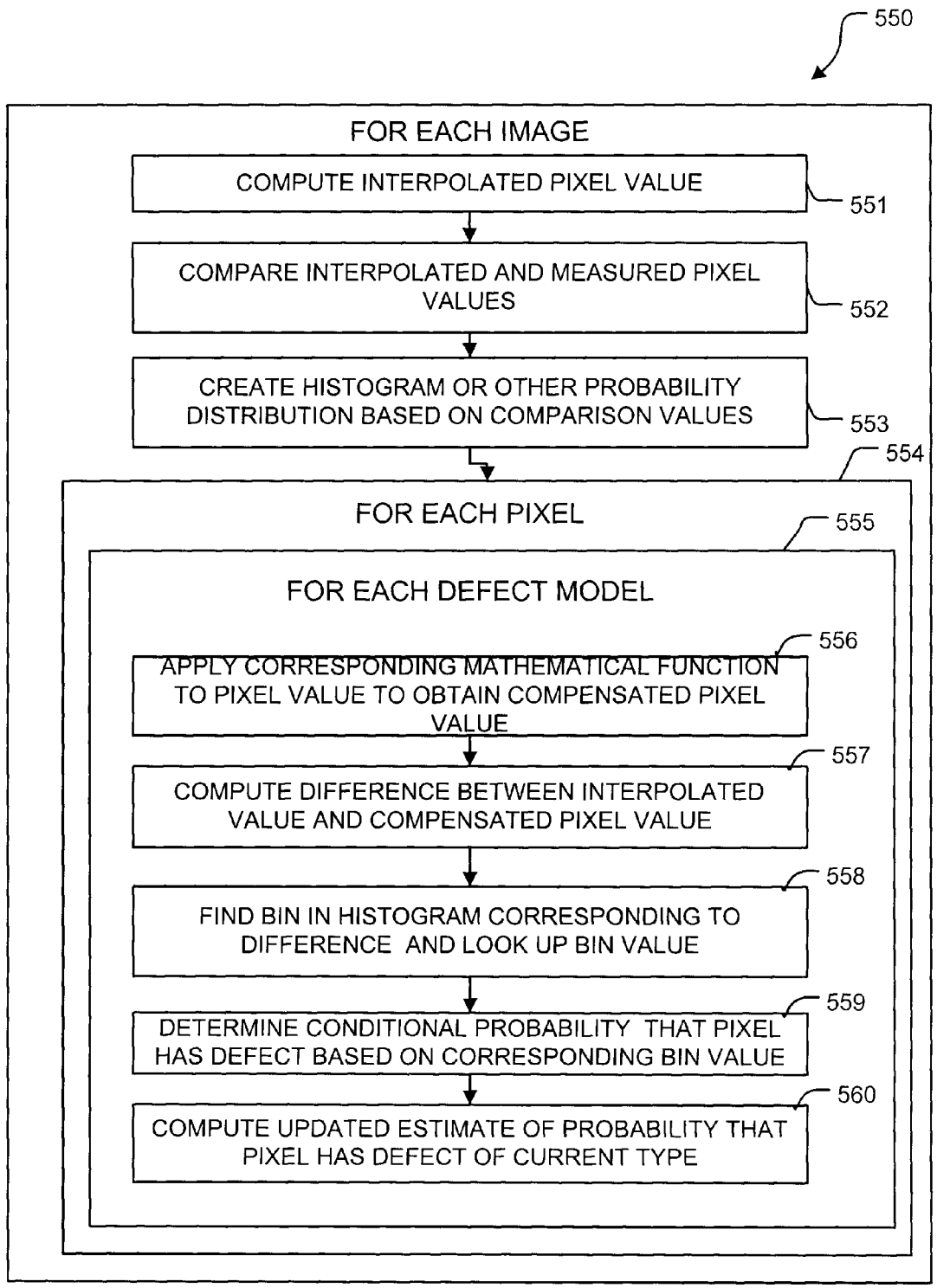

FIG. 5B is a flow chart illustrating a method 550 according to an embodiment of the invention. For each image, method 550 obtains an interpolated value for each pixel in block 551. The interpolated values are compared to the pixel values in block 552 (for example, by subtracting the interpolated and pixel values). In block 553 a histogram or other statistical metric is created from the comparison values of block 552.

Blocks 554 and 555 are repeated for each pixel to be tested and each defect model respectively. The order of nesting of blocks 554 and 555 is not critical. All pixels could be tested for one defect type before testing all pixels for the next defect type, each pixel could be tested for several defect types before moving to the next pixel, or some combination thereof. Further, different pixels and/or different defect types could be tested in parallel.

In block 556 a compensation function is applied to each pixel value to obtain a compensated pixel value. The compensation function is specific to the defect type. For the "good" defect type, the compensation function may be a unity operator. The compensation function assumes that the pixel has a defect of the type being tested for and attempts to predict from the actual value of the pixel a value that the pixel would have if the pixel were not defective. In some embodiments, the compensation function comprises one or more of:
  scaling;
  translation (applying an offset); and,
  applying a non-linear correction.

Block 557 compares the interpolated and compensated pixel values (for example, by subtracting one from the other). In block 558 the difference is looked up in the histogram created in block 553. Block 559 determines the conditional probability that the behaviour of the pixel matches the current defect type from the value looked up in block 558. Block 560 computes an updated estimate that the pixel matches the defect type being tested for, by, for example, applying Bayesian statistics to the conditional probability determined in block 559 and a prior probability obtained from processing other images.

Mathematical models for some defect types may broaden the distribution of the differences between the compensated and interpolated pixel values. This can be compensated for by filtering, smoothing, or otherwise suitably modifying the difference histogram before comparing the differences between the compensated and interpolated pixel values to the difference histogram. For example:
  the difference distribution may be convolved with a Gaussian probability distribution;
  the difference distribution may be replaced with an alternative distribution having a mean of 0 and a standard deviation (width) at least equal to that of the difference distribution;

As with method 500 described above, several processing steps may be applied to the original image data to optimize detection of defective pixels. Mathematical models are again provided for each defect type. In this case the mathematical models relate a relationship between actual and interpolated pixel values to the likelihood that a pixel has a particular type of defect. For each pixel the mathematical defect models may be evaluated with regard to the expected error distribution using Bayesian inferences. More specifically, the difference between actual and interpolated pixel values as measured at each pixel is modified to fit each defect model and compared to the expected error introduced by interpolation. The resulting probability indicates the likelihood of that error having been introduced due to poor interpolation or the presence of a defect at that location.

Using the comparison of actual and interpolated pixel values in evaluating the likelihood that a pixel is defective can permit more accurate detection of simple defects as well as detection of a wider range of complex defects. For example, consider a pixel that consistently outputs a dark value because it frequently records a dark area in a night-time scene. An embodiment that compares actual and interpolated pixel values can readily detect that the pixel should have a low output and will not flag the pixel as faulty. More complicated defect models can evaluate for defects that cause a pixel output value to be consistently a certain fraction of the incident light (such as the half-sensitivity pixel considered above). Here, the pixel's value may fluctuate widely but will consistently be one-half the interpolated value, allowing for successful detection of the defect.

In cases where there are relatively few defective pixels in an imaging array (e.g. where the probability that any individual pixel is defective is well below 0.01%) there is a very low probability that any neighbouring pixels will also be defective. However as the pixel-defect probability increases, it becomes more likely that one or more of the nearest-neighbour pixels to any given pixel will be defective. Interpolation algorithms can give unsatisfactory results when the nearest-neighbours of a pixel include defective pixels because the interpolated value for a pixel can be altered by the values of any defective neighbouring pixels. In the case of some imaging arrays, for example some CCDs, whole or partial column or row failures are common failure modes. Where such failures may have occurred, the interpolation methods should be modified (for example to not take potentially-defective neighbouring pixels into account or to weigh potentially-defective neighbouring pixels less in the interpolation).

Even at low defect levels interpolation may involve use of defective pixel values to obtain interpolated values for pixels neighbouring the defective pixel. These problems can be addressed by changing the interpolation method where the probabilities estimate that the nearest neighbours include defective pixels.

A round-robin method may be used to avoid the problems caused when neighbouring defective pixels cause errors in interpolated pixel values. In a round-robin method, the value of each pixel is compared to the values of neighbouring pixels one-by one, in sequence. The difference between the value of a pixel and one of its neighbouring pixels may be used to establish a posterior probability that the pixel is "good" or has any of a number of other specified defect types. This may be done in substantially the same way described above for the interpolation method. The difference between the pixel value and the values of other neighbouring pixels are then used one-by-one to establish new probabilities that the pixel is "good" or has any of the other specified defect types. In each case, the probability at the end of the previous step is used as prior probability. Each application of the round-robin method compares a pixel value to the values of a sequence of neighbouring pixels. The probability that the pixel is good, or has any of a number of defects is considered after completion of the sequence of comparisons. The process can be repeated for each pixel to be tested by the round-robin method. It is not necessary to apply the round-robin method to testing all pixels.

In one embodiment, the round-robin method involves the following steps:
Compare the pixel value to that of a first neighbour, PIXEL1, to obtain an error $E_1$ (which may be the difference between the value of the pixel being tested and the value of PIXEL1).
Compute $P(E_1|H_0)$ for each defect type based upon the applicable mathematical models.
Calculate $P(H_0|E_1)=P(E_1|H_0)\times P(H_0)/P(E_1)$
Compare the pixel value to a second neighbour, PIXEL2, to obtain an error $E_2$.
Compute $P(E_2|H_0)$ for each defect type based upon the applicable mathematical models. This is typically (but not necessarily) done in the same manner as computing $P(E_1|H_0)$.
Compute $P(H_0|E_2)=P(E_2|H_0)\times P(E_1|H_0)/P(E_2)$ such that the posterior probability from the first iteration takes the prior probability for this iteration.
Repeat for additional neighbours.

A round-robin method may take into account any group of neighbours in any sequence.

In some embodiments, some iterations may be weighted more heavily than others. For example, diagonally-adjacent nearest-neighbours may be weighted less heavily (e.g. ½ as heavily) as directly adjacent neighbours.

An alternative iterative process may be used to reduce the influence of measured values of any defective pixels on the interpolated values for other pixels. Such a process can deal effectively with cases where there may be clusters of defective pixels or clusters of pixels having sensitivities that vary very widely. In such a process, an initial defect map may be obtained by comparing interpolated pixel values to measured pixel values. The initial defect map may include significant numbers of pixels that are good but are falsely identified as being faulty because their measured values differ significantly from their interpolated values. The interpolated values can then be recalculated in a way that has been modified to reduce the impact of any pixels identified as defective in the initial defect map. Such pixels may be left out of the interpolation or given reduced weights in the interpolation. The recalculated interpolated values can then be compared to the measured pixel values to yield a refined defect map. This process may be iterated to obtain successively better defect maps.

As alternatives to giving pixels identified as being defective zero or reduced weights, pixels identified on a defect map may be compensated for by:
using alternative interpolation algorithms in the vicinities of pixels identified as being defective;
using a prior defect map to estimate the correct values for pixels identified as being defective.

In such iterative methods, it is not necessary to use the same methods in every iteration to compensate for pixels identified as being defective. Different methods may be used in different iterations. Further, the mathematical models used to identify defective pixels may be changed from iteration-to-iteration to take advantage of the increasingly-refined defect map.

It will be understood that it is possible also to provide a combined method where the probability that a pixel has a particular type of defect is updated using interpolation methods in some cases and methods based on the pixel value in other cases. For example statistical methods based on the pixel's value may be used where adjacent pixels are suspected to be defective, the particular statistics of a given image are suspect, and/or for a particular type of defects. Interpolation methods may be used for some defect types while statistical methods are used for other defect types. It is also possible to update the probability that a pixel has a particular type of defect based on both the value of the pixel and on a difference between that value and an interpolated value.

Where the imaging array is a colour imaging array, in some cases processing the colour image to perform demosaicing may produce improved results as compared to using raw data for interpolation-based methods. Demosaicing allows nearest-neighbour pixels to be more closely-spaced than is possible if pixels of each colour are treated as separate imaging arrays.

Figure 9:
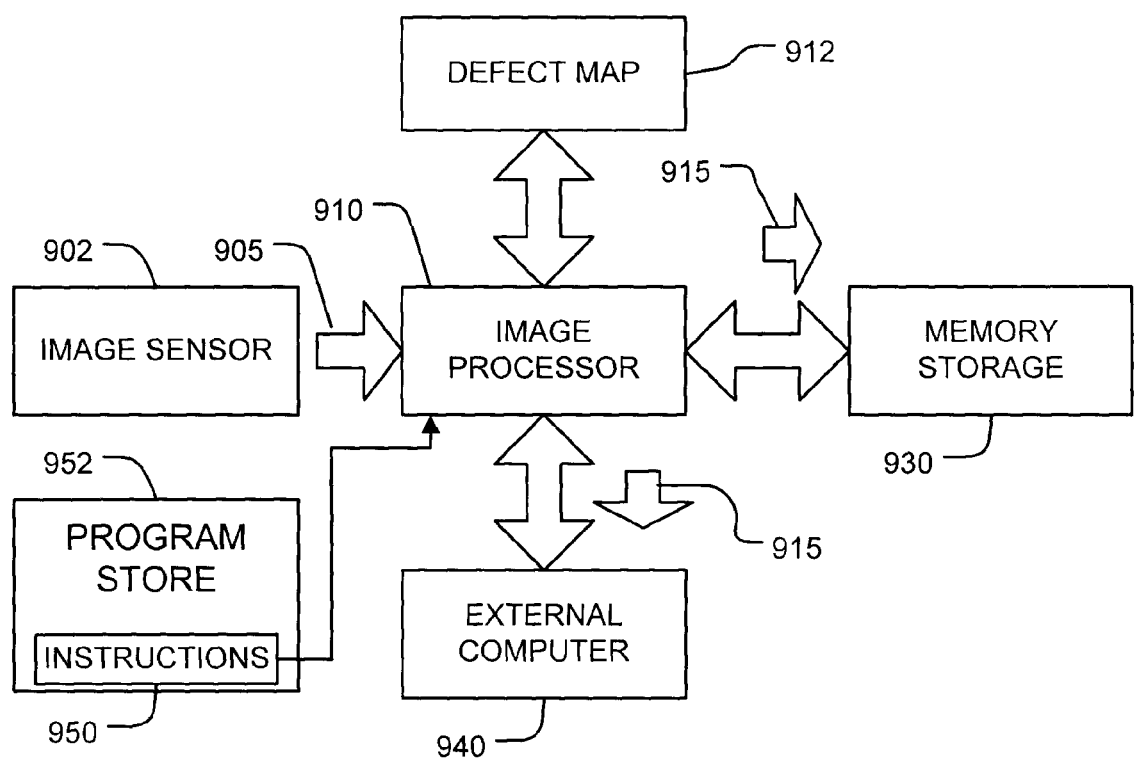

FIG. 9 shows apparatus 900 according to an embodiment of the invention. Apparatus 900 acquires images and converts the images to digital data. Apparatus 900 may be a camera, for example. Apparatus 900 includes an imaging array 902. Imaging array 902 acquires image data 905. Image data 905 is provided to image processor 910. Image processor 910 executes algorithms to process image data 905. For example, image processor 910 may execute algorithms to perform calibration corrections, noise reduction, colour demosaicing, white balance correction, contrast enhancement and other image adjustments.

Image processor 910 also corrects images for known defects by use of a defect map 912. Defect map 912 identifies pixels of imaging array 902 that are known to be defective. Image processor 910 may automatically replace the output values for pixels identified as being defective in defect map 912 with values established by a suitable correction technique. Any of various correction techniques such as suitable interpolation algorithms may be used. For defective pixels having defect types which show a response to illumination levels the correction techniques may base corrected values at least in part on output values of the defective pixels.

Processed image data 915 is stored in a data store 930. Data store 930 may be within device 900. Data store 930 may comprise a removable storage device such as a flash memory card. Alternatively, or in addition, processed image data files 915 may be downloaded from image processor 910 to an external computer 940 either directly as images are taken or, more commonly, by transferring image files from data store 930 through image processor 910 to external computer 940. Alternatively, where data store 930 is removable, data store 930 may be removed and connected directly to external computer 940 for downloading images to external computer 940.

Image processor 910 may be configured to perform a defect detection method (such as method 500). This may be done by providing software or firmware instructions 950 in a program store 952 accessible to image processor 910. The defect detection method may update the probabilities that pixels of imaging array 902 have certain defects by analysing image data as new images are taken. However, as defects tend to develop slowly over time, a preferred embodiment performs defect detection when imaging device 900 is placed in a calibration mode. The calibration mode may be invoked, for example, by an operator by way of a suitable user interface. In the calibration mode, image processor 910 performs the defect detection method using images already collected in data store 930. The defect detection method produces a new or updated defect map which is stored as defect map 912.

Although the precise order in which images in the set of images is processed does not matter in most embodiments of the invention, it is preferable that the images in the set be recently-acquired if it is desired to detect pixels that may have failed recently. For example, the calibration mode may perform defect detection based on the set of N most recently-acquired images available when the calibration mode is invoked (optionally augmented by one or more dark-field images that may be obtained during the calibration).

Practitioners of the art will recognize that defect detection methods are preferably performed using digital raw image data. Such data may make it easier to detect the defects rapidly as images compressed using methods such as JPEG lose some accuracy in the pixel information.

Optionally, in the calibration mode, image processor 910 could cause imaging array 902 to acquire one or more dark-field images. The dark-field image(s) may be used to make initial estimates of the likelihood that pixels have certain types of defect. This can speed up the convergence rate in the defect detection method.

After a new or updated defect map 912 has been prepared, image processor 910 can optionally use the new or updated defect map 912 together with suitable interpolation methods, to replace values for defective pixels in the images currently stored in data store 930. The new or updated defect map 912 can also be used to correct future images until the calibration mode is invoked again.

Alternatively a defect detection method could be implemented on external computer 940 which will operate on images stored in that computer from a given imaging system. The external computer 940 could create the new or updated defect map. The new or updated defect map could be applied in external computer 940 to correct existing, past or future images obtained from imaging system 900. Alternatively the external computer 940 could upload the new or updated defect map to image processor 910 for storage in the defect map storage 912.

In some embodiments of the invention, sufficient information regarding the nature of a defective pixel is obtained to recalibrate the defective pixel. In such cases, the method may involve updating a calibration table for such pixels.

Embodiments which detect and determine the exposure characteristics of hot pixels (e.g. the value b discussed above) can be used to permit longer exposure times for imaging arrays. For very long exposure times even normally-operating pixels of many imaging arrays behave, to some degree or another, as hot pixels. After a long exposure in which the output values of hot pixels have acquired significant offsets (which may differ from pixel-to-pixel) the methods described herein may be applied to determine the offset for each hot pixel and to subtract that offset to yield a corrected image.

The methods and apparatus described herein have a wide range of applications. For example, a user of a digital camera may take a great many images. At some point the user decides to have the camera tested for defective pixels. The user collects a batch of recent photographs taken with the digital camera and e-mails those photographs to a service bureau. The service bureau runs software that analyses the images, as described above, to identify defective pixels of several types.

The service bureau then generates a defect map which specifies which pixels of the user's camera are defective and the nature of the defects. The service bureau provides the user with software that uses the defect map to correct the user's images. For defects of types that show a response to illumination the software may generate a corrected pixel value based at least in part on the pixel value. The user can run the software against the user's previously-taken images to correct those images.

In some embodiment, the service bureau uses methods as described herein to determine at least approximately when individual pixels became defective. This may be done by applying the methods described herein to batches of images taken during different date ranges. The software may take into account the dates on which individual defects arose when correcting the user's previously-taken images.

The service bureau may also provide the user with an updated defect map that the user can upload into the camera. The updated defect map may cause the camera to apply compensation for some or all of the defective pixels. The service bureau may also determine the sensitivities of pixels in the user's camera and determine whether the sensitivities of any pixels have changed over time. The service bureau may provide the user with an updated sensitivity map that can be uploaded to the user's camera.

In another embodiment, a camera user takes images with a digital camera and uploads those images to a computer. The computer runs software which stores the images and automatically (or on command) analyses the images to identify pixels in the camera that may be defective. The software may automatically generate and upload to the camera updated defect maps and/or sensitivity maps, as required. The software may automatically (or on command) make corrections for any defective pixels.

Certain implementations of the invention comprise data processors which execute software instructions which cause the processors to perform a method of the invention (for example, a method as shown in one or more of FIGS. 5, 5A and 5B). The invention may also be provided in the form of a program product. The program product may comprise any medium which carries a set of computer-readable signals comprising instructions which, when executed by a data processor, cause the data processor to execute a method of the invention. The program product may be in any of a wide variety of forms. The program product may comprise, for example, media such as magnetic data storage media such as floppy diskettes, hard disk drives, optical data storage media including CD ROMs, DVDs, electronic data storage media including ROMs, flash RAM, or the like.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Since memory cards are removable, they may contain images recorded over a wide range of time, and the sequence of images stored will not necessarily be that of the images taken by the imager. The stored image data files may be those with only corrections for pixel calibrations and noise reduction (Digital Raw images) or files with considerable image processing that may include compression of the data in formats which lose some of the information, such as JPEG. In some image data files the defect maps are also recorded.

While a number of exemplary aspects and embodiments have been discussed above, those of skill in the art will recognize certain modifications, permutations, additions and sub-combinations thereof. For example:

Instead of processing images individually the invention may be practiced by processing "images" obtained by aggregating other images together. For example, the values for corresponding pixels in a number of images may be added together to yield an aggregate image that may be processed according to the methods described above.

The images are not necessarily images representing visible light and are not necessarily optical images. The images may comprise images obtained through the use of any sort of array of imaging elements, whether those imaging elements are sensitive to visible light, infrared light, ultraviolet light, other electromagnetic radiation such as X-rays, or non-electromagnetic fields such as ultrasound, vibration, or the like.

It can be appreciated that this invention has a wide range of aspects, some broad and some more specific. It is intended that the inventive concepts described herein shall encompass all modifications, permutations, additions and sub-combinations as would be understood to persons skilled in the field of designing systems for detecting defects in imaging arrays in light of the foregoing description.

What is claimed is:

1. A method for detecting defects in imaging arrays comprising arrays of pixels, the method comprising,
   obtaining a set of images acquired by an imaging array, each image comprising a set of pixel values corresponding to pixels of the image;
   taking each of a plurality of images in the set as a current image and obtaining for at least one of the pixels, for each of one or more of a plurality of defect types, a corresponding updated probability, the updated probability based at least in part upon:
   a pixel value corresponding to the at least one pixel;
   statistics of pixel values of other pixels in the current image; and
   one or more prior probabilities that the one of the pixels has the corresponding defect type.

2. A method according to claim 1 wherein, for at least one of the defect types, updating the probability that the at least one pixel has the defect type comprises obtaining image statistics for the current image and basing the updated probability at least in part on a model of the defect type and the image statistics.

3. A method according to claim 2 wherein the image statistics comprise a proportion of pixels in the current image that have pixel values in a range that includes the pixel value for the at least one pixel.

4. A method according to claim 3 wherein, for a defect-free defect type the probability that the pixel has the defect free defect type is proportional to the proportion of pixels in the current image that have pixel values in a range that includes the pixel value for the at least one pixel.

5. A method according to claim 4 wherein updating the probability that the pixel has the defect type comprises applying Bayesian statistical inference.

6. A method according to claim 5 wherein, for at least one of the defect types, the model comprises an imaging parameter associated with the current image and the model is based at least in part on the imaging parameter.

7. A method according to claim 6 wherein the imaging parameter comprises an exposure time.

8. A method according to claim 1 comprising:
   for a plurality of the images including the current image, acquiring a statistical distribution of the pixel values in the image;
   wherein obtaining the updated probability for at least one of the plurality of defect types for the current image is based at least in part on the statistical distribution corresponding to the current image and a model of the at least one of the plurality of defect types.

9. A method according to claim 8 wherein the at least one pixel comprises a plurality of pixels.

10. A method according to claim 9 wherein the plurality of pixels comprises substantially all of the pixels in the images.

11. A method according to claim 9 comprising, prior to evaluating the probability that the at least one pixel has a defect type:
    specifying a model behavior for each defect type; and,
    for each defect type, establishing an initial probability for each pixel that the pixel has the defect type.

12. A method according to claim 11 wherein specifying the model behavior for a defect type comprises providing a mathematical function which relates the response of pixels having each defect type to a stimulus strength.

13. A method according to claim 12 wherein the mathematical function is a function of at least one imaging parameter in addition to the stimulus strength.

14. A method according to claim 13 wherein the at least one imaging parameter comprises an exposure time.

15. A method according to claim 11 wherein the model behavior for at least one of the defect types comprises a noise model.

16. A method according to claim 2 comprising establishing an initial probability for each of the plurality of defect types.

17. A method according to claim 16 wherein the initial probability is different for each of the plurality of defect types.

18. A method according to claim 16 wherein the initial probability is a function of pixel location for one or more of the plurality of defect types.

19. A method according to claim 8 wherein the pixel value for the at least one pixel is in a range from zero to a maximum value, and wherein acquiring a statistical distribution of the pixel values in the image comprises generating a histogram relating possible pixel values to the probability that a pixel will have that output value.

20. A method of claim 1 comprising, after processing each of the images, testing a condition for termination of the method and processing another image if the termination condition is not satisfied.

21. A method according to claim 20 comprising, if the termination condition is satisfied, establishing a defect map based upon the updated probabilities for one or more of the defect types.

22. A method according to claim 21 wherein the defect map specifies the location and defect type of each defective pixel.

23. A method according to claim 22 wherein the termination condition is satisfied when a predetermined number of the images have been processed.

24. A method according to claim 22 wherein the termination condition is satisfied when a probability of one of the defect types is greater than a threshold and greater than probabilities of the other defect types and has remained so during processing of a predetermined number of the images.

25. A method according to claim 1 comprising, for each pixel in the imaging array, identifying a defect type having the highest probability that exceeds a predetermined threshold as a defect type for the pixel.

26. A method according to claim 1 comprising acquiring one or more dark-field images using the imaging array and including the one or more dark-field images in the set of images.

27. A method according to claim 1 wherein the defect types include stuck-low and stuck-high defect types.

28. A method according to claim 1 wherein the defect types include high-sensitivity and low-sensitivity defect types.

29. A method according to claim 1 wherein the plurality of defect types comprise one or more of stuck-low, stuck-high, low-sensitivity, high-sensitivity and hot-pixel defect types.

30. A method according to claim 2 comprising performing interpolation to obtain an estimated value of a given pixel based on the values of other pixels and comparing the estimated value for the given pixel to the pixel value for the given pixel.

31. A method according to claim 30 comprising establishing a histogram of differences between the pixel value of each pixel and the estimated value for the pixel.

32. A method according to claim 31 comprising basing the probability that a pixel has one of the defect types at least in part on the difference between the estimated value and pixel value for that pixel.

33. A method according to claim 30 wherein obtaining the updated probability that the pixel has the one defect type comprises applying a compensation function corresponding to the defect type to the pixel value to yield a compensated pixel value, comparing the compensated and estimated pixel values, and determining from image statistics a proportion of pixels in the image having pixel values differing from estimated values in a range that includes a result of the comparison.

34. A method according to claim 33 wherein comparing the compensated and estimated pixel values comprises computing a difference between the compensated and estimated pixel values.

35. A method according to claim 33 wherein performing interpolation comprises excluding one or more pixels identified as being defective from the interpolation.

36. A method according to claim 30 wherein the image statistics comprise statistics regarding differences between the estimated and pixel values for pixels in the image.

37. A method according to claim 1 comprising basing the probability that a pixel has one of the defect types at least in part on a result of a comparison of the pixel value for that pixel and a pixel value for another pixel in the image.

38. A method according to claim 37 comprising basing the probability that a pixel has the one defect type at least in part on a sequence of comparisons of the pixel value for that pixel and pixel values for a sequence of other pixels in the image.

39. A method according to claim 37 wherein obtaining the updated probability that the pixel has the one defect type comprises:

applying a compensation function corresponding to the defect type to the pixel value to yield a compensated pixel value;

for each comparison, comparing the compensated pixel value to the pixel value for the other pixel in the image; and for each comparison, determining from image statistics a proportion of pixels in the image having pixel values differing from pixel values of corresponding other pixels in a range that includes a result of the comparison.

40. A method according to claim 39 wherein obtaining an updated probability that the pixel has the one defect type comprises applying Bayesian inference to the results of the comparisons.

41. A method according to claim 40 wherein applying Bayesian inference comprises, for a plurality of the comparisons computing a conditional probability for the one defect type based upon a mathematical model associated with the defect type.

42. A method according to claim 37 wherein obtaining the updated probability comprises combining the conditional probabilities from the plurality of comparisons and weighting one or more of the conditional probabilities differently from others.

43. A method according to claim 1 comprising performing the method separately on each of a number of different blocks in the imaging array.

44. A method according to claim 1 comprising performing the method separately on each of a number of different or patterns of pixels in the imaging array.

45. A method according to claim 1 comprising comparing images in the set of images to ensure that the images are sufficiently different from one another.

46. A method for categorizing a pixel of an imaging array into one of a plurality of defect types, the method comprising:
    acquiring an image taken by the imaging array;
    obtaining an image statistic for the image; and,
    determining a probability that the pixel has one of the defect types based at least in part upon a pixel value corresponding to the pixel in the image and the image statistic;
    wherein the image is one of a plurality of images acquired by the imaging array and the method comprises repeating the steps of acquiring an image, obtaining an image statistic for the image and determining a probability that the pixel has one of the defect types for each of the plurality of images and determining an updated probability that the pixel has the one of the defect types based upon the probability determined for each of the plurality of images.

47. A method according to claim 46 wherein determining an updated probability that the pixel has the one of the defect types based upon the probability determined for each of the images comprises applying an inference method to the to the probability determined for each of the plurality of images.

48. A method according to claim 47 wherein the inference method comprises a Bayesian inference method.

49. A method according to claim 46 wherein the image statistic comprises a proportion of pixels in the image or an area within the image having a value in a range of one or more values that includes the pixel value of the pixel.

50. A method according to claim 46 wherein the image statistic comprises a proportion of pixels in the image or an area within the image for which a difference between the pixel value and an interpolated estimate of the pixel value has a value in a range that includes the difference between the pixel value of the pixel and an interpolated estimate of the pixel value of the pixel.

51. A method for detecting defects in imaging arrays comprising an array of pixels, the method comprising:
   acquiring a set of images taken by the imaging array during normal operation;
   for each of the images, acquiring a statistical distribution of the pixel output values in the image;
   for each of a plurality of pixels, evaluating a probability that the pixel has a defect condition based at least in part on the pixel value and the statistical distribution;
   establishing a plurality of pixel defect types to be identified and for each of the pixels, for each of the defect types, evaluating a probability that the pixel has the defect type; and,
   prior to evaluating the probability that the pixel has a defect condition:
   specifying a model behavior for each defect type; and
   for each defect type, establishing an initial probability for each pixel that the pixel has the defect type.

52. A method according to claim 51 wherein specifying the model behavior for each defect type comprises providing a mathematical function which relates the response of each defect type to an intensity measured by an element of the imaging array.

53. A method according to claim 52 wherein the mathematical function is a function of at least one imaging parameter in addition to the intensity.

54. A method according to claim 53 wherein the at least one imaging parameter comprises an exposure time.

55. Data processing apparatus comprising:
   at least one data processor;
   a data store containing a plurality of images obtained by an imaging array;
   a program store containing software instructions which, when executed by the data processor, cause the data processor to execute a method according to claim 1 wherein the set of images comprises the plurality of images contained in the data store.

56. Apparatus according to claim 55 wherein the apparatus comprises a camera.

57. Apparatus according to claim 56 wherein the apparatus is configured to operate on new images as the new images are acquired.

58. Apparatus according to claim 55 comprising an editable defect map.

59. A method for determining sensitivities of elements in an imaging array comprising an array of imaging elements, the method comprising:
   providing a plurality of sensitivity models, each corresponding to a different sensitivity;
   acquiring a set of images taken by the imaging array, each image comprising an array of pixels;
   for each of the images, acquiring a statistical distribution of pixel values in the image;
   for each of the images creating a predicted statistical distribution for each of the sensitivity models based at least in part upon the statistical distribution and the sensitivity models; and,
   for each of the images obtaining a conditional probability that a pixel matches each of the sensitivity models based at least in part on the pixel value of the pixel and the predicted statistical distribution corresponding to the sensitivity model.

60. A method according to claim 1 wherein the corresponding defect type is characterized by one or more of: a high sensitivity, a low sensitivity and an offset.

* * * * *